(12) United States Patent
Sakai et al.

(10) Patent No.: US 10,756,915 B2
(45) Date of Patent: Aug. 25, 2020

(54) WIRELESS COMMUNICATION DEVICE, METHOD OF WIRELESS COMMUNICATION, AND PROGRAM

(71) Applicant: SONY CORPORATION, Tokyo (JP)

(72) Inventors: Eisuke Sakai, Tokyo (JP); Tomoya Yamaura, Tokyo (JP)

(73) Assignee: SONY CORPORATIOn, Tokyo (JP)

( * ) Notice: Subject to any disclaimer, the term of this patent is extended or adjusted under 35 U.S.C. 154(b) by 67 days.

(21) Appl. No.: 15/540,585

(22) PCT Filed: Nov. 10, 2015

(86) PCT No.: PCT/JP2015/081535
§ 371 (c)(1),
(2) Date: Jun. 29, 2017

(87) PCT Pub. No.: WO2016/111085
PCT Pub. Date: Jul. 14, 2016

(65) Prior Publication Data
US 2017/0366362 A1 Dec. 21, 2017

(30) Foreign Application Priority Data
Jan. 9, 2015 (JP) .................................. 2015-003437

(51) Int. Cl.
*H04L 12/18* (2006.01)
*H04W 4/06* (2009.01)
(Continued)

(52) U.S. Cl.
CPC .......... *H04L 12/189* (2013.01); *H04L 5/0055* (2013.01); *H04W 4/06* (2013.01); *H04W 28/04* (2013.01); *H04W 84/12* (2013.01)

(58) Field of Classification Search
CPC .... H04L 12/189; H04L 5/0055; H04W 28/04; H04W 4/06; H04W 84/12
See application file for complete search history.

(56) References Cited

U.S. PATENT DOCUMENTS 6,567,851 B1 * 5/2003 Kobayashi .............. H04L 12/18
370/312
2001/0049291 A1 12/2001 Sato et al.
(Continued)

FOREIGN PATENT DOCUMENTS

JP        2001-298407 A    10/2001
JP        2003-23462 A     1/2003
(Continued)

OTHER PUBLICATIONS

International Search Report dated Jan. 26, 2016 in PCT/JP2015/081535 filed Nov. 10, 2015.

*Primary Examiner* — Mandish K Randhawa
(74) *Attorney, Agent, or Firm* — Xsensus LLP

(57) ABSTRACT

A wireless communication device and associated method more flexibly changes a destination of an acknowledgement request. The wireless communication device includes a wireless communication interface to communicate wirelessly with another wireless communication device, and a controller to control the wireless communication interface to transmit, to the other wireless communication device, a first message that requests change in a destination of an acknowledgement request frame relating to multicast transmission by the other wireless communication device.

17 Claims, 10 Drawing Sheets

(51) Int. Cl.
    *H04W 84/12*     (2009.01)
    *H04W 28/04*     (2009.01)
    *H04L 5/00*     (2006.01)

(56) References Cited

U.S. PATENT DOCUMENTS

| | | | |
|---|---|---|---|
| 2007/0258466 A1* | 11/2007 | Kakani | H04L 1/1614 |
| | | | 370/395.53 |
| 2010/0165907 A1* | 7/2010 | Chu | H04L 12/1868 |
| | | | 370/312 |
| 2011/0167291 A1* | 7/2011 | Liu | H04W 52/20 |
| | | | 713/340 |
| 2013/0077554 A1* | 3/2013 | Gauvreau | H04L 5/001 |
| | | | 370/312 |
| 2015/0172011 A1* | 6/2015 | Aboul-Magd | H04L 5/0007 |
| | | | 370/330 |
| 2015/0382381 A1* | 12/2015 | Kakani | H04L 1/1825 |
| | | | 370/312 |

FOREIGN PATENT DOCUMENTS

| | | |
|---|---|---|
| JP | 2009-100389 A | 5/2009 |
| JP | 2014-53832 A | 3/2014 |
| WO | 2004/093396 A1 | 10/2004 |
| WO | WO 2011/130344 A1 | 10/2011 |
| WO | WO 2014/035605 A1 | 3/2014 |

\* cited by examiner

WIRELESS COMMUNICATION DEVICE, METHOD OF WIRELESS COMMUNICATION, AND PROGRAM

TECHNICAL FIELD

The present disclosure relates to a wireless communication device, a method of wireless communication, and a program.

BACKGROUND ART

A wireless local area network (LAN) system faces in some cases propagation loss, shadowing, fading, collision between frames, or the like, and so a phenomenon may occur in which a receiver fails to receive a frame transmitted from a transmitter. In order to address such a phenomenon, the wireless LAN system may employ retransmission control using an acknowledgment (ACK) and a negative-acknowledgment (NACK) in some cases. In the retransmission control techniques using a response from the receiving side, the receiving side may return an acknowledgment response including information indicating success or failure of data reception in response to an acknowledgement request from the data transmitting side. An example of the techniques includes the retransmission control using a Block ACK Request (BAR) frame and a Block ACK (BA) frame, which allows acknowledgements for reception related to one or more transmission frames to be executed together.

Here, IEEE802.11aa, which is one of the standards for wireless LAN, defines the technique for performing the retransmission control using the BAR and the BA is performed between a parent device (Access Point: AP) and a slave device (Station: STA). Specifically, the technique is defined in which the AP transmits by unicast the BAR to a plurality of STAs belonging to a multicast group and receives the BA from the STA, thereby performing the retransmission control relating to multicast transmission. This technique makes it possible, in the case where the number of STAs belonging to a multicast group is small, to achieve a highly reliable wireless communication environment by allowing the AP to transmit the BAR to all the STAs and to receive the BA from all the STAs, in one example. However, in the case where the number of STAs belonging to a multicast group is large, the overhead of transmitting and receiving the BAR and the BA may deteriorate the throughput.

In view of the above circumstances, Patent Literature 1 below discloses a technique of grouping STAs of a multicast group and performing transmission and reception of the BAR and the BA to and from only a representative terminal set for each group.

CITATION LIST

Patent Literature

Patent Literature 1: JP 2014-053832A

DISCLOSURE OF INVENTION

Technical Problem

In the technique disclosed in patent Literature 1, the grouping and selection of the representative terminal are performed in a precise manner. For this reason, in one example, in the case where a situation in which the STA perform reception changes, the deterioration in throughput is difficult to be prevented without re-grouping, and the re-grouping causes large overhead. Thus, in the present disclosure, there is provided a new and improved wireless communication device, method of wireless communication, and program, capable of more flexibly changing a destination of an acknowledgement request.

Solution to Problem

According to the present disclosure, there is provided a wireless communication device including: a wireless communication unit configured to communicate wirelessly with another wireless communication device; and a control unit configured to control the wireless communication unit such that the wireless communication unit transmits, to the other wireless communication device, a first message that requests change in a destination of an acknowledgement request frame relating to multicast transmission by the other wireless communication device.

In addition, according to the present disclosure, there is provided a wireless communication device including:

a wireless communication unit configured to communicate wirelessly with another wireless communication device; and a control unit configured to select a destination of an acknowledgement request frame relating to multicast transmission by the wireless communication unit on the basis of a first message that requests change in the destination of the acknowledgement request frame received from the other wireless communication device by the wireless communication unit.

In addition, according to the present disclosure, there is provided a method of wireless communication in a wireless communication device that communicates wirelessly with another wireless communication device, the method including: transmitting, to the other wireless communication device, a first message that requests change in a destination of an acknowledgement request frame relating to multicast transmission by the other wireless communication device.

In addition, according to the present disclosure, there is provided a method of wireless communication in a wireless communication device that communicates wirelessly with another wireless communication device, the method including: selecting a destination of an acknowledgement request frame relating to multicast transmission by the wireless communication device on the basis of a first message that requests change in the destination of the acknowledgement request frame received from the other wireless communication device by the wireless communication unit.

In addition, according to the present disclosure, there is provided a program for causing a computer to function as: a wireless communication unit configured to communicate wirelessly with another wireless communication device; and a control unit configured to control the wireless communication unit such that the wireless communication unit transmits, to the other wireless communication device, a first message that requests change in a destination of an acknowledgement request frame relating to multicast transmission by the other wireless communication device.

In addition, according to the present disclosure, there is provided a program for causing a computer to function as: a wireless communication unit configured to communicate wirelessly with another wireless communication device; and a control unit configured to select a destination of an acknowledgement request frame relating to multicast transmission by the wireless communication unit on the basis of a first message that requests change in the destination of the acknowledgement request frame received from the other wireless communication device by the wireless communication unit.

Advantageous Effects of Invention

As described above, according to the present disclosure, it is possible to change more flexibly the destination of the acknowledgement request. Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
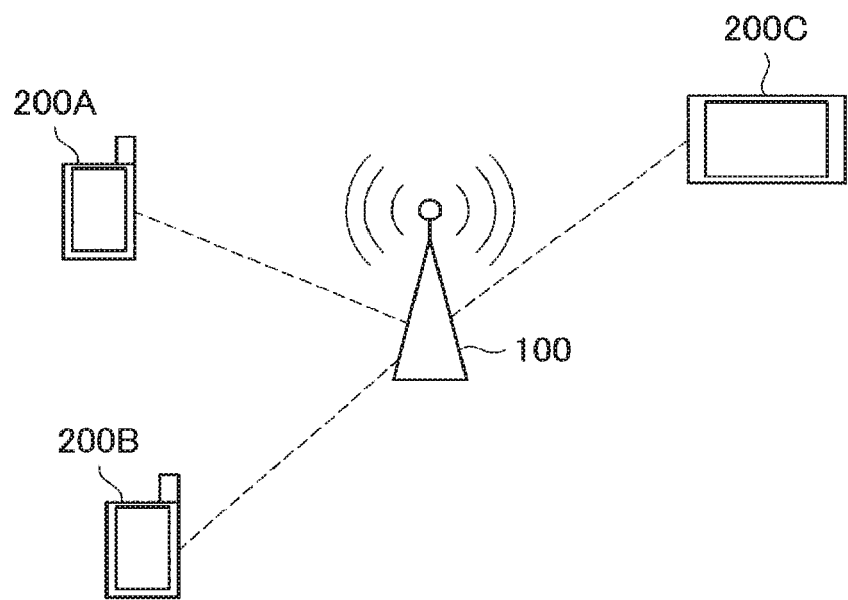
FIG. 1 is a diagram illustrating an example of the overall configuration of a wireless communication system according to an embodiment of the present disclosure.

Hereinafter, preferred embodiments of the present disclosure will be described in detail with reference to the appended drawings. In this specification and the appended drawings, components that have substantially the same function and structure are denoted with the same reference numerals, and repeated description of these components is omitted.

Further, in the present description and drawings, a plurality of components having substantially the same functional configuration may be distinguished from each other by each of the components having a different alphabetical letter added to the end of the same reference numeral. In one example, a plurality of components having substantially the same functional configuration may be distinguished from each other as necessary, such as wireless communication devices 100A, 100B, and 100C. However, if it is not particularly necessary to distinguish each of a plurality of components having substantially the same functional configuration, only the same reference numeral is assigned. In one example, if it is not particularly necessary to distinguish among the wireless communication devices 100A, 100B, and 100C, they are simply referred to as a wireless communication device 100.

Further, the description is given in the following order.
1. Overall configuration
2. Basic configuration
2.1. AP
2.2. STA
3. Details of function
3.1. BAR or BA transmission and reception function
3.2. BAR destination change function
4. Application examples
5. Summary <<1. Overall Configuration>>

First, the overall configuration of a wireless communication system according to an embodiment of the present disclosure is described with reference to FIG. 1.

FIG. 1 is a diagram illustrating an example of the overall configuration of a wireless communication system 1 according to an embodiment of the present disclosure. As illustrated in FIG. 1, the wireless communication system 1 includes a wireless communication device 100 and one or more wireless communication devices 200. The wireless communication device 100 is an AP that provides a wireless communication service to one or more STAs connected to the wireless communication device 100. The wireless communication device 200 is an STA that is connected to the AP 100 and performs wireless communication. In the example illustrated in FIG. 1, the STAs 200A and 200B are smartphones, and STA 200C is a tablet terminal. The communication from the AP 100 to the STA 200 is also referred to as a downlink (DL), and the communication from the STA 200 to the AP 100 is referred to as an uplink (UL).

In one example, the AP 100 and the STAs 200A to 200C are connected to communicate wirelessly with each other, and each of them directly transmits and receives a frame. The STAs 200A to 200C may belong to a single multicast group, and the AP 100 performs multicast transmission targeting the STAs 200A to 200C. In addition, the AP 100 completes preparation for transmitting and receiving the BAR and the BA by transmitting and receiving an ADDBA request and an ADDBA response to and from the STAs 200A to 200C. This allows all the STAs 200A to 200C to be in a state of capable of receiving the BAR and returning the BA. In the following, unless otherwise mentioned, the STA 200 belongs to a single multicast group, and completes preparation for transmitting and receiving the BAR and the BA.

The above is a description of the example of the overall configuration of the wireless communication system 1 according to the present embodiment. Subsequently, an example of the basic configuration of the AP 100 and the STA 200 according to the present embodiment is described with reference to FIGS. 2 and 3.

<<2. Basic Configuration>>
<2.1. AP>

Figure 2:
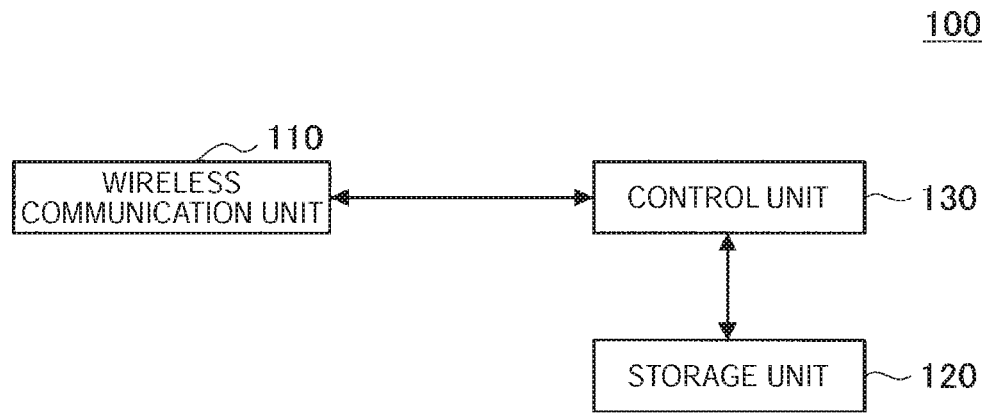
FIG. 2 is a block diagram illustrating an example of a logical configuration of an AP according to the present embodiment.

FIG. 2 is a block diagram illustrating an example of a logical configuration of the AP 100 according to the present embodiment. As illustrated in FIG. 2, the AP 100 includes a wireless communication unit 110, a storage unit 120, and a control unit 130.

(1) Wireless Communication Unit 110

The wireless communication unit 110 is a wireless communication interface that mediates wireless communication with other devices by the AP 100. In the present embodiment, the wireless communication unit 110 performs wireless communication with the STA 200. In one example, the wireless communication unit 110 receives a wireless signal transmitted from the STA 200. The wireless communication unit 110 may have a function as an amplifier, a frequency converter, a demodulator, or the like, and, in one example, can output the received data to the control unit 130. In addition, the wireless communication unit 110 transmits a wireless signal to the STA 200 via an antenna. In addition, the wireless communication unit 110 may have a function as a modulator, an amplifier, or the like, and, in one example, may perform modulation, power amplification, or the like on the data output from the control unit 130 and then transmits the result.

The wireless communication unit 110 according to the present embodiment performs the multicast transmission to the STA 200. In addition, the wireless communication unit 110 transmits the BAR to an STA acting as a BAR destination selected by the control unit 130, and receives the BA. Moreover, the BA includes a BA bitmap (an acknowledgment response bitmap) indicating success or failure of reception of a series of multicast packets. The multicast packet used herein refers to a multicast packet addressed to a multicast group to which the STA 200 itself belongs. In addition, the wireless communication unit 110 transmits and receives various messages used to flexibly change the BAR destination among the STAs 200.

(2) Storage Unit 120

The storage unit 120 is a component that records and reproduces data on and from a predetermined recording medium. In one example, the storage unit 120 stores information that indicates a BAR destination selected by the control unit 130.

(3) Control Unit 130

The control unit 130 functions as an arithmetic processing unit and a control unit, and controls the overall operation in the AP 100 in accordance with various programs.

In one example, the control unit 130 has a function of selecting a BAR destination. In one example, the control unit 130 may select a BAR destination of one or more STAs 200 belonging to the multicast group on the basis of information on the reception state relating to the multicast transmission from the AP 100. This information is also referred to hereinafter as reception state information. The reception state information includes at least one of throughput, packet loss rate, number of multicast packets received successfully, number of multicast packets that fail to be received, or ratio of a sum of noise power and interference signal power to desired signal power. The AP 100 can select a BAR destination on the basis of the reception state information, thereby improving the reliability of the entire wireless communication system 1. Moreover, the control unit 130 may determine at least one of a modulation scheme or an error-correction coding rate used for data transmission on the basis of the reception state information.

The control unit 130 may control the wireless communication unit 110 so that the wireless communication unit 110 transmits a message, which requests the reception state information from the STA 200, to the STA 200, and thus acquires the reception state information from the STA 200. This message is also referred to hereinafter as a reception state information request message. In addition, the control unit 130 acquires the reception state information from the message including a response received by the wireless communication unit 110 from the STA 200. This message is also referred to hereinafter as a reception state information response message.

The timing at which the control unit 130 selects a BAR destination may be considered to be various manners. In one example, the control unit 130 may select a destination of the BAR for multicast transmission by the wireless communication unit 110 on the basis of a message (a first message) that requests to change the BAR destination received by the wireless communication unit 110 from the STA 200. This message is also referred to hereinafter as a destination change request message. This message allows the control unit 130 to flexibly change the BAR destination depending on the change in the radio wave environment or the like of the STA 200. This makes it possible for the AP 100 to improve the reliability of the entire multicast group. Moreover, the control unit 130 may employ the change request indicated by the received destination change request message without any modification, or may select it, in one example, on the basis of information indicating the reception state in the STA 200. Alternatively, the control unit 130 may select the BAR destination, in one example, in a periodic manner.

In one example, the control unit 130 may control the wireless communication unit 110 so that the wireless communication unit 110 transmits a message (a second message) including information indicating a result obtained by selecting the BAR destination to the STA 200 acting as the source of the destination change request message. The message including information indicating the selection result of the BAR destination is also referred to hereinafter as a destination change response message. This message allows the STA 200 to know that the STA 200 is selected as the BAR destination, that the STA 200 is excluded from the BAR destination, or that the request from the STA 200 itself is refused.

In one example, the control unit 130 may control the wireless communication unit 110 so that the wireless communication unit 110 transmits a message (a third message) including information used for a trigger (condition) to transmit the destination change request message from the STA 200. This message is also referred to hereinafter as a destination change request trigger setting message. This message allows the AP 100 to control the situation, timing, or the like where the STA 200 transmits the destination change request message.

Further, the control unit 130 may control the wireless communication unit 110 so that the wireless communication unit 110 transmits a message, which notifies that the BAR is transmitted, to the STA 200 selected as the BAR destination. In addition, the control unit 130 may control the wireless communication unit 110 so that the wireless communication unit 110 transmits a message, which notifies that the BAR is not transmitted, to the STA 200 that is not selected as the BAR destination. Such messages are also referred to hereinafter as a BAR destination notification message. This message allows the STA 200 to know explicitly that the STA 200 is selected or not selected as the BAR destination, and thus the STA 200 can transmit the destination change request message depending on its own reception state or the like. Moreover, in the case where the AP 100 does not transmit the BAR destination notification message, the STA 200 can determine whether the STA 200 is selected as the BAR destination on the basis of whether the BAR is transmitted to the STA 200 itself within a predetermined period.

<2.2. STA>

Figure 3:
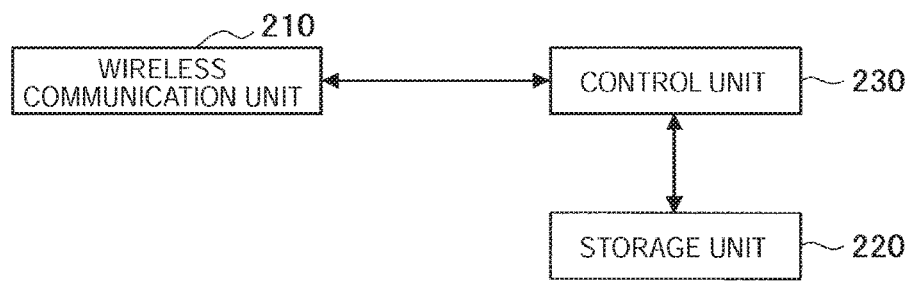
FIG. 3 is a block diagram illustrating an example of a logical configuration of an STA according to the present embodiment.

FIG. 3 is a block diagram illustrating an example of a logical configuration of the STA 200 according to the present embodiment. As illustrated in FIG. 3, the STA 200 includes a wireless communication unit 210, a storage unit 220, and a control unit 230.

(1) Wireless Communication Unit 210

The wireless communication unit 210 is a wireless communication interface that mediates wireless communication with other devices by the STA 200. In the present embodiment, the wireless communication unit 210 performs wireless communication with the AP 100. In one example, the wireless communication unit 210 receives a wireless signal transmitted from the AP 100. The wireless communication unit 210 may have a function as an amplifier, a frequency converter, a demodulator, or the like, and, in one example, can output the received data to the control unit 230. In addition, the wireless communication unit 210 transmits a wireless signal to the AP 100 via an antenna. In addition, the wireless communication unit 210 may have a function as a modulator, an amplifier, or the like, and, in one example, may perform modulation, power amplification, or the like on the data output from the control unit 230 and then transmit the result.

The wireless communication unit 210 according to the present embodiment receives a frame transmitted by multicast from the AP 100. In addition, the wireless communication unit 210 receives the BAR from the AP 100 and transmits the BA to the AP 100. In addition, the wireless communication unit 210 transmits and receives various messages used to perform flexibly a change of the BAR destination between the AP 100 and the STAs 200.

(2) Storage Unit 220

The storage unit 220 is a component that records and reproduces data on and from a predetermined recording medium. In one example, the storage unit 220 stores information included in the destination change request trigger setting message or the like notified from the AP 100.

(3) Control Unit 230

The control unit 230 functions as an arithmetic processing unit and a control unit, and controls the overall operation performed in the STA 200 in accordance with various programs.

In one example, the control unit 230 has a function of controlling the wireless communication unit 210 so that the wireless communication unit 210 transmits a message, which requests to change a destination of the BAR for multicast transmission by the AP 100 (a destination change request message), to the AP 100. The destination change request message allows the STA 200 to flexibly change the BAR destination.

The destination change request message may be a message that requests to include the STA 200 itself in the BAR destination. In other words, this message is a message in which the STA 200 requests to start transmission of the BAR to the STA 200 itself. This message is also referred to hereinafter as a BAR start request message. This message allows the STA 200 to request the AP 100 to cause the STA 200 to be the BAR destination, in one example, in the case where the reception state is worse than a threshold. In the case where this request is accepted and the BAR destination is determined, the STA 200 can receive appropriate retransmission. Here, the reception state (or reception state information) that is worse than a threshold means that, for example, in the case where the reception state information is throughput, a value smaller than a threshold is calculated. In one example, in the case where the reception state information is a packet loss rate, it means that a value larger than a threshold is calculated. A reception state that is better than the threshold means that the opposite is true. Moreover, this threshold is specified by the destination change request trigger setting message notified from the AP 100.

The destination change request message may be a message that requests to exclude the STA 200 itself from the BAR destination. In other words, this message is a message in which the STA 200 requests to stop transmission of the BAR to the STA 200 itself. This message is also referred to hereinafter as a BAR stop request message. This message allows the STA 200 to request the AP 100 to exclude the STA 200 itself from the BAR destination, in one example, in the case where the reception state is better than the threshold. In the case where this request is accepted and the STA 200 is excluded from the BAR destination, it is possible to increase the opportunity for another STA 200 in the multicast group to be selected as the BAR destination.

In one example, the control unit 230 may control the wireless communication unit 210 so that the wireless communication unit 110 transmits the reception state information response message to the AP 100. In one example, the control unit 230 acquires the reception state information, which is requested by the AP 100 and is specified by the reception state information request message notified from the AP 100, and causes the reception state information response message to be returned.

The above is a description of the example of the basic configuration of the AP 100 and the STA 200 according to the present embodiment. Subsequently, functions of the AP 100 and the STA 200 according to the present embodiment are described in detail.

<<3. Details of Function>>

Hereinafter, BAR or BA transmission and reception functions of transmitting and receiving the BAR or the BA and a BAR destination change function of changing the BAR destination in each of the AP 100 and the STA 200 are described in detail.

<3.1. BAR or BA Transmission and Reception Functions>
(Details of Function on AP Side)

As described above, the control unit 130 acquires the reception state information of the STA 200 by transmitting the reception state information request message to the STA 200. In one example, the control unit 130 may control the wireless communication unit 110 so that the wireless communication unit 110 transmits by multicast the reception state information request message. This allows the AP 100 to acquire the reception state information of each of the STAs 200 belonging to the multicast group. The reception state information request message may include various information.

In one example, the control unit 130 may include an identifier used to identify the reception state information to be requested in the reception state information request message. Thus, the reception state information response message includes the reception state information corresponding to the identifier.

In one example, the control unit 130, when requesting the packet loss rate, can include the total number of multicast packets to be transmitted in the reception state information request message. This allows the STA 200 to calculate the packet loss rate. Moreover, the STA 200 may calculate the total number of multicast packets transmitted by the AP 100 from the minimum sequence number and the maximum sequence number of the packet received by the STA 200 itself. In this case, the control unit 130 does not necessarily include the total number of multicast packets to be transmitted in the reception state information request message.

In one example, the control unit 130, when requesting the number of multicast packets that fail to be received, can include the total number of multicast packets to be transmitted in the reception state information request message. This allows the STA 200 to calculate the number of multicast packets that fail to be received. Moreover, the STA 200 may calculate the number of multicast packets that fail to be received from a sequence number that is unable to be received between the minimum sequence number and the maximum sequence number of a packet received successfully by the STA 200 itself. In this case, the control unit 130 does not necessarily include the total number of multicast packets to be transmitted in the reception state information request message. However, in IEEE 802.11, the sequence number of a multicast packet may be common to all multicast groups and management frames including a beacon frame. In this case, the packet with a sequence number that is not received is not necessarily a packet addressed to the STA 200 itself. In such a case, the STA 200 may simply count packets with a sequence number that is not received as the number of multicast packets that fail to be received, or may perform filtering on packets, in one example, depending on the frame type or whether a frame is addressed to the frame itself and then may count packets.

In one example, the control unit 130 may include information, which indicates a threshold used to determine whether the STA 200 returns the reception state information response message, in the reception state information request message. In one example, the control unit 130 may use, as the threshold, a raw value of the reception state information, or a value uniquely derived from a quantized value, an instantaneous value, an average value, or other raw values. Additionally, in the case where the reception state information is received previously from the STA 200 acting as the destination of the reception state information request message, the control unit 130 may use the rate of change over the previous reception state information as the threshold. In addition to this, the control unit 130 may include a plurality of thresholds, such as an upper limit value and a lower limit value, for one reception state information item in the reception state information request message. In this case, the control unit 130 can cause the reception state information response message to be transmitted to the STA 200 in which the reception state information is within the range between the upper limit value and the lower limit value. The value of the threshold specified by the control unit 130 may be a preset default value, or may be a value calculated by the control unit 130 from the congestion degree of the propagation path or the like. Moreover, it is desirable from the viewpoint of efficiency that this threshold is the same as the threshold used to select the BAR destination in the AP 100. Moreover, in the case where the threshold is not included in the reception state information request message, the STA 200 may return the reception state information response message by using the reception of the reception state information request message as a trigger.

In addition to this, the reception state information request message may include a measurement start time and a measurement period. In this case, it is possible to keep the accuracy of information collected from each of the STAs 200 constant.

The reception state information request message may be transmitted using, in one example, a Radio Measurement Request frame. In this case, the control unit 130 may store information, which is to be notified to the STA 200 such as an identifier used to identify the requested reception state information, in any field within the Radio Measurement Request frame. In one example, the control unit 130 may store it in Information Element exemplified below, or may store it in one of sub-elements of Information Element listed below.

Channel load request
Noise histogram request
Frame request
STA statistics request
LCI request
Transmit stream/category measurement request
Multicast diagnostics request
New Information Element In one example, the control unit 130 may select the STA 200 in which the reception state information is within the range of the threshold as the BAR destination. As this threshold, a plurality of values, such as an upper limit value and a lower limit value, may be set for one reception state information item. The upper limit value may be, in one example, a value determined to select the STA 200 having a bad reception state as the BAR destination. In one example, the control unit 130 selects the STA 200 that reports the reception state information with a value equal to or less than the upper limit value as the BAR destination. This makes it possible for the AP 100 to improve the reliability of the entire multicast group. On the other hand, the lower limit value may be a value determined not to select the STA 200 having an extremely bad reception state as the BAR destination. In one example, the control unit 130 does not select the STA 200 that reports the reception state information with a value equal to or less than the lower limit value as the BAR destination. In this case, the control unit 130 can avoid selecting the STA 200 having the extremely bad reception state as the BAR destination. This makes it possible for the AP 100 to reduce the overhead due to excessive retransmission. The control unit 130 may use a threshold that is set by default in the wireless communication system 1, or may adaptively calculate a threshold on the basis of the congestion degree of the propagation path or the like.

The control unit 130 may set the maximum number of the BAR destinations. The control unit 130 selects the STA 200 acting as the BAR destination within a range not exceeding the set maximum number. This allows the AP 100 to reduce the excessive transmission and reception of the BAR and the BA. Here, as the number of BARs increases, the overhead increases, and the band is overloaded, so the throughput of the entire wireless communication system 1 may decrease. Thus, it is desirable to manage the number of the STAs 200 acting as the BAR destination depending on the usage rate of the band. Thus, the control unit 130 may set the maximum number on the basis of the congestion degree of the propagation path with the STA 200. This makes it possible for the AP 100 to prevent the reduction in the throughput of the entire wireless communication system 1 depending on the state of the band. Of course, the control unit 130 may use a preset default maximum number.

Moreover, the control unit 130 may select the BAR destination one by one every time the reception state information response message is received from the STA 200. In this case, the AP 100 can improve the reliability even from the stage where the reception state information from the STAs 200 is not all gathered. Furthermore, it is possible to avoid the event where the reception situation information response messages are transmitted simultaneously from the STAs 200 and the bands are overloaded all at once. In addition, the control unit 130 may select the BAR destination in the case where the reception state information response message is received from the predetermined number of STAs 200. In this case, the AP 100 can prevent the STA 200 having a good reception state from being selected as the BAR destination, thereby preventing redundant BAR and BA from being transmitted or received.

The control unit 130 may control the power to transmit the multicast packet depending on the information on the reception state. In one example, in the case where the reception state of the STA 200 acting as the BAR destination is good, even if the AP 100 lowers the power to transmit the multicast packet, the STA 200 can be caused to receive it correctly. In such a case, the control unit 130 can decrease the transmission power, and thus the influence on other wireless terminals around the AP 100 can be reduced while maintaining the throughput, thereby improving the throughput of the entire system. On the other hand, in the case where the reception state of the STA 200 acting as the BAR destination is poor, the control unit 130 can increase the transmission power, and thus the probability of the correct reception by the STA 200 acting as the BAR destination is increased, thereby improving the throughput.

(Details of Function on STA Side)

As described above, the control unit 230 reports the reception state information requested from the AP 100 by transmitting the reception state information response message to the AP 100. In one example, the control unit 230 may control the wireless communication unit 110 so that the wireless communication unit 110 transmits by unicast the reception state information request message. The reception state information response message may include various information.

In one example, the reception state information response message may include the reception state information. The reception state information may be a measured raw value, or may be a value uniquely derived from a quantized value, an instantaneous value, an average value, or other raw values.

In one example, the reception state information response message may include information indicating the congestion degree of the propagation path, which is measured by the STA 200. This allows the AP 100 to set the maximum number of BAR destinations on the basis of the congestion degree of the propagation path.

The reception state information response message can be transmitted using, in one example, a Radio Measurement Report frame. In this case, the control unit 230 may store information, which is to be returned to the AP 100 such as the reception state information, in any field within the Radio Measurement Report frame. In one example, the control unit 230 may store it in Information Element exemplified below, or may store it in one of sub-elements of Information Element listed below.

Channel load report
Noise histogram report
Frame report
STA statistics report
LCI report
Transmit stream/category measurement report
Multicast diagnostics report
New Information Element (Example of Operation Processing)

Subsequently, the operation processing related to the BAR or BA transmission or reception function is described. First, an example of the operation processing in the entire wireless communication system 1 is described with reference to FIG. 4.

Figure 4:
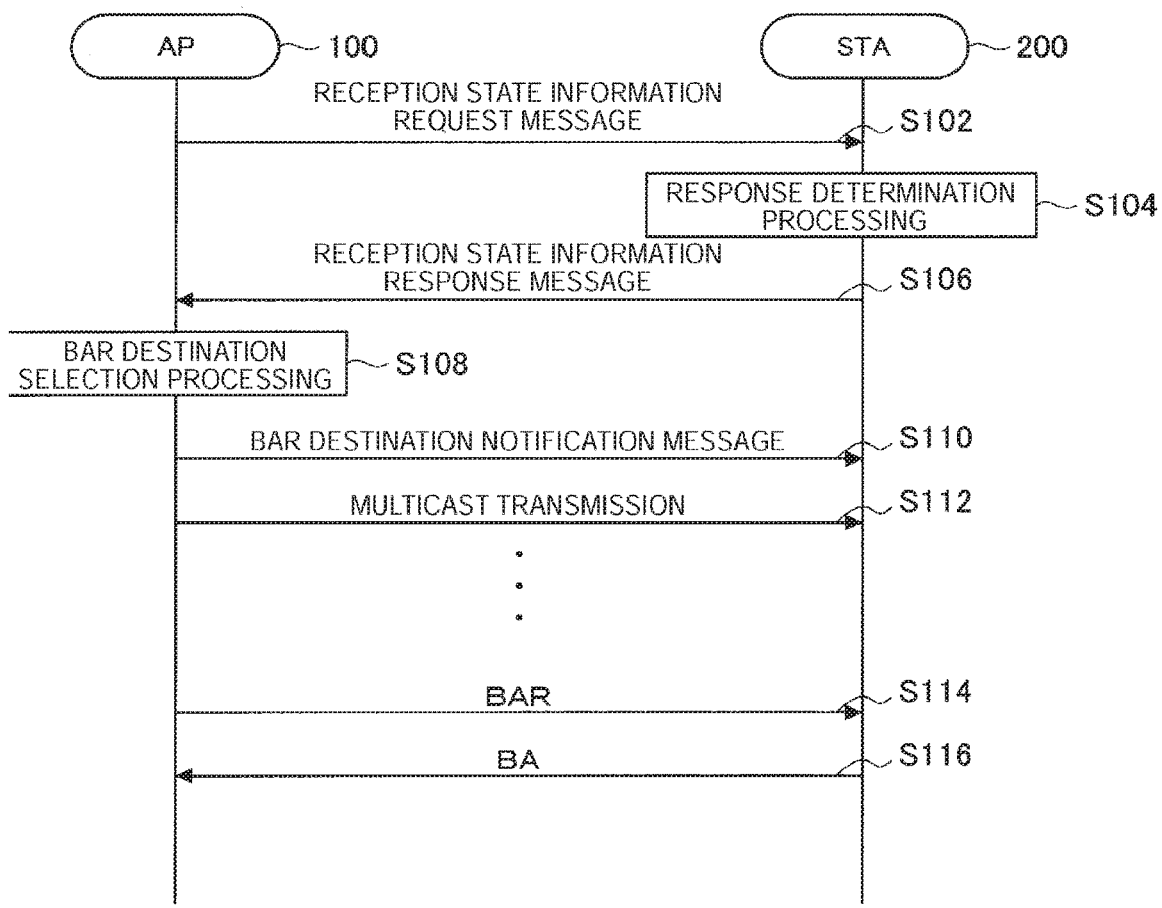
FIG. 4 is a sequence diagram illustrating an example of a BAR or BA transmission and reception processing procedure executed in the wireless communication system according to the present embodiment.

FIG. 4 is a sequence diagram illustrating an example of the procedure of the BAR or BA transmission and reception processing executed in the wireless communication system 1 according to the present embodiment. As illustrated in FIG. 4, the AP 100 and the STA 200 are involved in this sequence. Moreover, in FIG. 4, one STA 200 selected as the BAR destination is illustrated as a representative example, and the other STAs 200 are omitted.

First, in step S102, the AP 100 transmits a reception state information request message to the STA 200.

Next, in step S104, the STA 200 performs response determination processing. In one example, the STA 200 calculates the requested reception state information in the reception state information request message and determines whether to make a response. The details of the determination criteria will be described later with reference to FIG. 5.

Next, in step S106, the STA 200 transmits a reception state information response message to the AP 100.

Then, in step S108, the AP 100 performs BAR destination selection processing. In one example, the AP 100 determines an STA 200 to which the BAR is transmitted on the basis of the information included in the reception state information response message. The details of the determination criteria will be described later with reference to FIG. 6.

Next, in step S110, the AP 100 transmits a BAR destination notification message used to notify the STA 200 selected in step S108 that the BAR is to be transmitted.

Next, in step S112, the AP 100 performs multicast transmission to one or more STAs 200 belonging to a multicast group. The AP 100 may perform the multicast transmission multiple times.

Next, in step S114, the AP 100 transmits the BAR to the STA 200. In this case, the AP 100 transmits the BAR to the STA 200 selected as the BAR destination in step S108.

Then, in step S116, the STA 200, when receiving the BAR addressed to the STA 200 itself, transmits the BA to the AP 100.

The above is description of the example of the operation processing related to the BAR or BA transmission and reception function in the entire wireless communication system 1. Subsequently, an example of the operation processing in the AP 100 and the STA 200 is described with reference to FIGS. 5 and 6.

Figure 5:
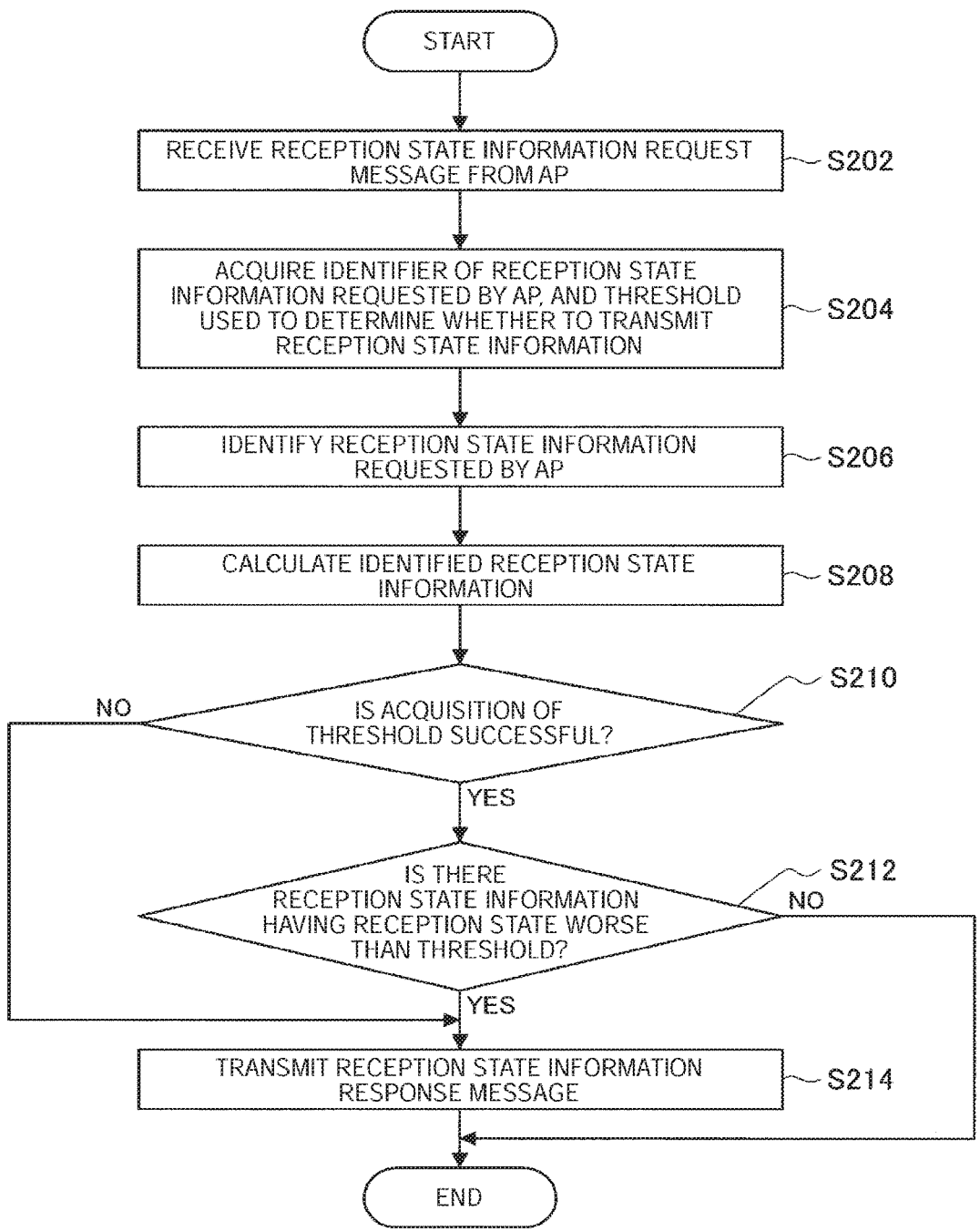
FIG. 5 is a flowchart illustrating an example of the procedure of reception state information response processing executed in the STA according to the present embodiment.

FIG. 5 is a flowchart illustrating an example of the procedure of reception state information response processing executed in the STA 200 according to the present embodiment.

As illustrated in FIG. 5, first, in step S202, the wireless communication unit 210 receives the reception state information request message from the AP 100.

Next, in step S204, the control unit 230 acquires an identifier of the reception state information requested by the STA 200 and a threshold used to determine whether to transmit the reception state information from the received reception state information request message. In addition, the control unit 230 may acquire a measurement start time and a measurement period from the received reception state information request message.

Next, in step S206, the control unit 230 identifies the reception state information requested by the AP 100 from the identifier acquired in step S204.

Next, in step S208, the control unit 230 calculates the reception state information identified in step S206. In one example, the control unit 230 performs measurement for the measurement period from the measurement start time acquired in step S204, and calculates the reception state information on the basis of a measurement result.

Next, in step S210, the control unit 230 determines whether acquisition of the threshold is successful in step S204.

If it is determined that the acquisition of the threshold is successful (YES in S210), the control unit 230 determines in step S212 whether there is reception state information having the reception state that is worse than the threshold. In one example, the control unit 230 performs the determination by comparing the threshold acquired in step S204 with the reception state information calculated in step S208. Moreover, if a plurality of thresholds are acquired in step S204, the control unit 230 may determine whether there is the reception state information having the reception state that is worse than the threshold with respect to one threshold of the plurality of thresholds, any plurality of thresholds, or all the thresholds that are acquired successfully.

If it is determined that there is reception state information having the reception state that is worse than the threshold (YES in S212), the control unit 230, in step S214, controls the wireless communication unit 210 so that the wireless communication unit 210 transmits the reception state information response message. In one example, the control unit 230 includes the reception state information calculated in step S208 in the reception state information response message, and causes the wireless communication unit 210 to transmit it to the AP 100. This is similarly applied to the case where it is determined that acquisition of the threshold fails (NO in S210).

If it is determined that there is no reception state information having the reception state that is worse than the threshold (NO in S212), the control unit 230 prevents the reception state information response message from being transmitted. In this case, the control unit 230 may cause the reception state information response message to be transmitted at the time when the reception situation information having the reception state that is worse than the threshold is generated by performing periodically the determination relating to step S212.

Figure 6:
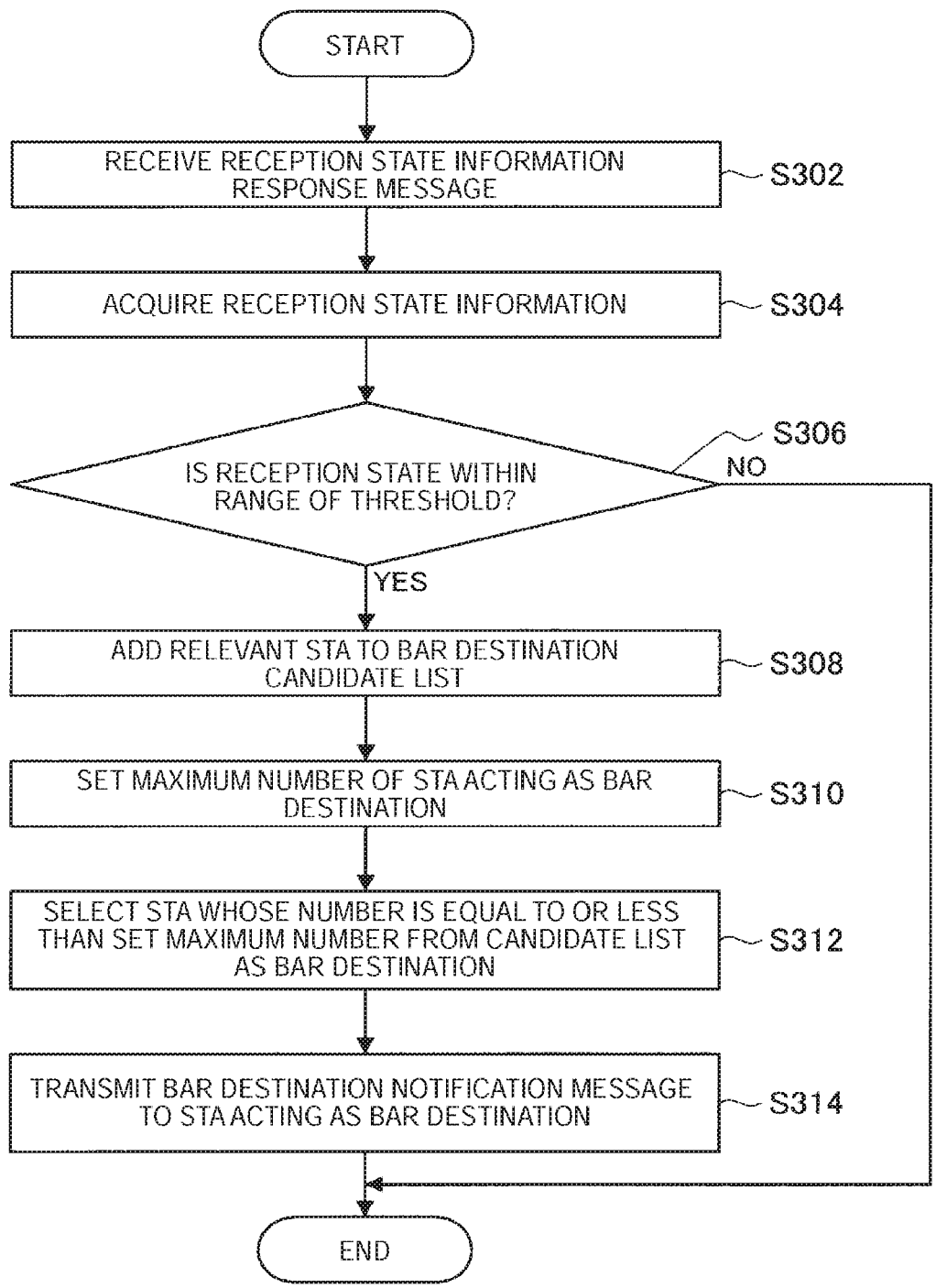
FIG. 6 is a flowchart illustrating an example of the procedure of BAR destination selection processing executed in the AP according to the present embodiment.

FIG. 6 is a flowchart illustrating an example of the procedure of the BAR destination selection processing executed in the AP 100 according to the present embodiment.

As illustrated in FIG. 6, first, in step S302, the wireless communication unit 110 receives the reception state information response message from the STA 200.

Next, in step S304, the control unit 130 acquires the reception state information from the reception state information response message.

Next, in step S306, the control unit 130 determines whether the reception state is within the range of a threshold. In one example, the control unit 130 determines whether the reception state information is included within the range of the upper limit value and the lower limit value that are preset or calculated on the basis of the congestion degree or the like.

If it is determined that the reception state is not within the range of the threshold (NO in S306), the processing ends.

On the other hand, if it is determined that the reception state is within the range of the threshold (YES in S306), in step S308, the control unit 130 adds the STA 200 acting as the source of the reception state information to a BAR destination candidate list. Moreover, the control unit 130 may update the BAR destination candidate list every time the reception state information response message is received from the STA 200.

Next, in step S310, the control unit 130 sets the maximum number of the STAs 200 acting as the BAR destination. In one example, the control unit 130 sets the maximum number on the basis of the information indicating the congestion degree of the propagation path, which is acquired from the reception state information response message.

Next, in step S312, the control unit 130 selects the STAs 200 whose number is equal to or less than the set maximum number from the candidate list as the BAR destination. In one example, the control unit 130 may select the BAR destination in order starting from the bad reception state among the STAs 200 included in the candidate list.

Then, in step S314, the control unit 130 controls the wireless communication unit 110 so that the wireless communication unit 110 transmits the BAR destination notification message, which indicates that it is selected as the BAR destination, to the STA 200 acting as the BAR destination.

The above is a description of an example of the operation processing related to the BAR or BA transmission and reception function.

<3.2. BAR Destination change Function>
(Details of Function on AP Side)

As described above, the control unit 130 transmits the destination change request trigger setting message to the STA 200, and thus sets a transmission trigger of a BAR start request message or a BAR stop request message in the STA 200. The control unit 130 may control the wireless communication unit 110 so that the wireless communication unit 110 transmits the destination change request trigger setting message using at least one of the broadcast frame and the multicast frame addressed to the multicast group to which the STA 200 belongs. As this frame, in one example, a beacon frame may be used. The destination change request trigger setting message may include various information.

First, the destination change request trigger setting message related to a trigger for transmitting the BAR stop request message is described. In one example, the destination change request trigger setting message may include at least one of information indicating a threshold of time elapsed since last reception of the BAR and information indicating a threshold of the reception state information. In addition, the destination change request trigger setting message may include at least one of information indicating a threshold of the reception power of the BA from another STA 200 (a wireless communication terminal) belonging to the same multicast group as the target STA 200, information indicating a threshold of the number of times the BA is received, and information indicating a threshold of the correlation value with a BA bitmap included in the BA. In one example, the control unit 130 may use, as the threshold, a raw value for each value (e.g., elapsed time and reception state information) described above, or a value uniquely derived from a quantized value, an instantaneous value, an average value, or other raw values.

Subsequently, the destination change request trigger setting message related to a trigger for transmitting the BAR start request message is described. In one example, the destination change request trigger setting message may include at least one of information indicating a threshold of a period during which no BAR is received, information indicating a threshold of the reception state information, and information indicating the upper limit number that is capable of transmitting the BAR start request message in a beacon interval. Moreover, the information indicating the threshold of the reception state information may be information indicating a threshold related to the value itself of the reception state information or information indicating a threshold related to the rate of change in values of the reception state information. The control unit 130 may use, as the threshold, a raw value for each value (e.g., period, or reception state information) or a value uniquely derived from a quantized value, an instantaneous value, an average value, or other raw values.

The control unit 130 selects the BAR destination on the basis of the destination change request message received by the wireless communication unit 110.

In one example, the control unit 130 determines whether to stop the transmission of the BAR to the STA 200 acting as the source on the basis of the BAR stop request message. In this event, the control unit 130 may perform the determination using different criteria depending on the trigger identifier included in the BAR stop request message. The control unit 130, when determining that the transmission of the BAR to the STA 200 acting as the source is to be stopped, may transmit a message used to notify that the transmission of the BAR is to be stopped to the STA 200. Similarly, the control unit 130, when determining that the transmission of the BAR to the STA 200 acting as the source is not to be stopped, may transmit a message used to notify that the transmission of the BAR is not to be stopped to the STA 200. In addition, the control unit 130, when determining that the transmission of the BAR to the STA 200 acting as the source is to be stopped, may select a new destination from the BAR destination candidate list.

In one example, the control unit 130 determines whether to start transmitting the BAR to the STA 200 acting as the source on the basis of the BAR start request message. In this event, the control unit 130 may perform the determination on the basis of the reception state information or the BA bitmap included in the BAR start request message. The control unit 130, when determining that the transmission of the BAR to the STA 200 acting as the source is to be started, may exclude at least one of the STAs 200 selected as the BAR destination as described above from the destination. In addition, if it is determined that the transmission of the BAR to the STA 200 acting as the source is to be started, the control unit 130 may transmit a message used to notify that the transmission of the BAR is to be started to the STA 200. Similarly, if it is determined that the transmission of the BAR to the STA 200 acting as the source is not to be started, the control unit 130 may transmit a message used to notify that the transmission of the BAR is not to be started to the STA 200. In addition, in the case where the BA bitmap is included in the BAR start request message, the control unit 230 may perform retransmission of the multicast packet on the basis of the BA bitmap.

(Details of Function on STA Side)

First, transmission of the BAR stop request message is described.

In one example, the control unit 230 controls the wireless communication unit 210 so that the wireless communication unit 210 transmits the BAR stop request message by using various triggers exemplified below. Moreover, the control unit 230 may use a combination of a plurality of triggers.

In one example, the control unit 230 may set, as the trigger, an event where the control unit 230 itself is the BAR destination. This allows the STA 200 to avoid transmitting an unnecessary BAR stop request message. In one example, in the case where the control unit 230 is notified by the AP 100 that the BAR addressed to the control unit 230 itself is received successfully within the threshold of the elapsed time specified by the destination change request trigger setting message or that the control unit 230 is the BAR destination, the control unit 230 itself can know that the control unit 230 itself is the BAR destination.

In one example, the control unit 230 may set, as the trigger, an event where the reception state information is improved than the threshold. This allows the AP 100 to change the BAR destination from the STA 200 in which the reception state information is improved due to movement or the like to another STA 200 having the reception state that is worse than the STA 200 having the improved reception state information. Thus, the reception state (e.g., throughput) of the entire multicast group can be improved. In one example, in the case where the reception state information is improved over the threshold specified by the destination change request trigger setting message, the control unit 230 causes the BAR stop request message to be transmitted. Here, the improvement of the reception state (or the reception state information) over the threshold means the transition from a state in which a value smaller than the threshold is calculated to a state in which a value larger than the threshold is calculated, in one example, in the case where the reception state information is the throughput. This is reversely applied to the fact that the reception state (or the reception state information) is deteriorated than the threshold.

In one example, the control unit 230 may set, as the trigger, the successful reception of the BA from another STA 200 (a wireless communication terminal) belonging to a multicast group to which the control unit 230 belongs. The successful reception of the BA from the other STA 200 is assumed that the STA 200 is close to the other STAs 200, and so it is possible to avoid responding a redundant BA. A packet error typically occurs due to distance attenuation, fading, shadowing, and collision with other packets. However, the STAs 200 located close to each other may have high correlation of distance attenuation rate, shadowing, and interference amount due to collision with other packets. Thus, information of an error packet reported to the AP 100 by the BA bit map included in the BA transmitted from two STAs 200 located close to each other is likely to be highly correlated. Thus, the response of the BAs from the two STAs 200 located close to each other may be redundant. Furthermore, the control unit 230 may set, as the trigger, an event where the reception power of the BA from another STA 200 that succeeds in reception exceeds a threshold. In addition, the control unit 230 may set, as the trigger, an event where the number of times that succeed in receiving the BA from another STA 200 exceeds a threshold. In addition, the control unit 230 may also set, as the trigger, an event where the correlation value between the BA bitmap included in the BA from another STA 200 that succeeds in reception and the BA bitmap related to reception in the wireless communication unit 210 exceeds a threshold. This is because, as the correlation value is higher, the BA to which the STA 200 responds becomes redundant BA.

In one example, the control unit 230 may set, as the trigger, an event where the control unit 230 withdraws from the multicast group. In one example, the control unit 130, when detecting termination or the like of the application that necessitates wireless communication, causes the BAR stop request message to be transmitted. This allows the AP 100 to change the BAR destination from the STA 200 from which the BA is no longer returned due to withdrawal to another STA 200.

The BAR stop request message may include a trigger identifier indicating which of the triggers described above to perform the transmission. The AP 100 can determine whether to stop transmitting the BAR to the STA 200 by referring to this identifier.

Subsequently, the transmission of the BAR start request message is described.

In one example, the control unit 230 controls the wireless communication unit 210 so that the wireless communication unit 210 transmits the BAR start request message using various triggers exemplified below. Moreover, the control unit 230 may use a combination of a plurality of triggers.

In one example, the control unit 230 may set, as the trigger, an event where the control unit 230 is not the BAR destination. This allows the STA 200 to avoid transmitting an unnecessary BAR start request message. In one example, the control unit 230 may set, as the trigger, an event where the period during which the BAR is not received exceeds the threshold specified by the destination change request trigger setting message. In addition, the control unit 230 may set, as the trigger, an event where the AP 100 notifies that the control unit 230 is not the BAR destination.

In one example, the control unit 230 may set, as the trigger, an event where the upper limit number that is capable of transmitting the BAR start request message in a predetermined period is not reached, which is specified by the destination change request trigger setting message. The setting of the transmittable upper limit number for each predetermined period makes it possible to prevent the BAR start request message from being excessively transmitted and consuming the bandwidth. When the predetermined period is elapsed, the BAR start request message can be transmitted until the number of times of transmission is reset or the transmittable upper limit number is reached. This predetermined period may be a beacon interval, in one example. Alternatively, the predetermined period may be an integer multiple of the beacon interval, an interval of time such as just a few microseconds, or a period during which the STA 200 is connected to the multicast group.

In one example, the control unit 230 may set, as the trigger, an event where the reception state information is deteriorated than the threshold. This allows the AP 100 to set the STA 200 having the reception state information that is deteriorated due to movement or the like as the BAR destination. Thus, the reception state of the entire multicast group can be improved. In one example, in the case where the reception state information is worse than the threshold specified by the destination change request trigger setting message, or in the case where the deterioration rate of the reception state information exceeds the threshold, the control unit 230 causes the BAR start request message to be transmitted.

The BAR start request message may include a BA bitmap for the multicast transmission from the AP 100. In addition, the BAR start request message may include the reception state information in the wireless communication unit 210 for the multicast transmission from the AP 100. It is desirable that the BAR start request message includes the BA bitmap for retransmission of the multicast packet from the AP 100. In one example, the BAR start request message may be BA, or may be a Radio Measurement Report frame.

(Example of Operation Processing)

Subsequently, the operation processing related to the BAR destination change function is described. First, an example of the operation processing in the entire wireless communication system 1 is described with reference to FIG. 7.

Figure 7:
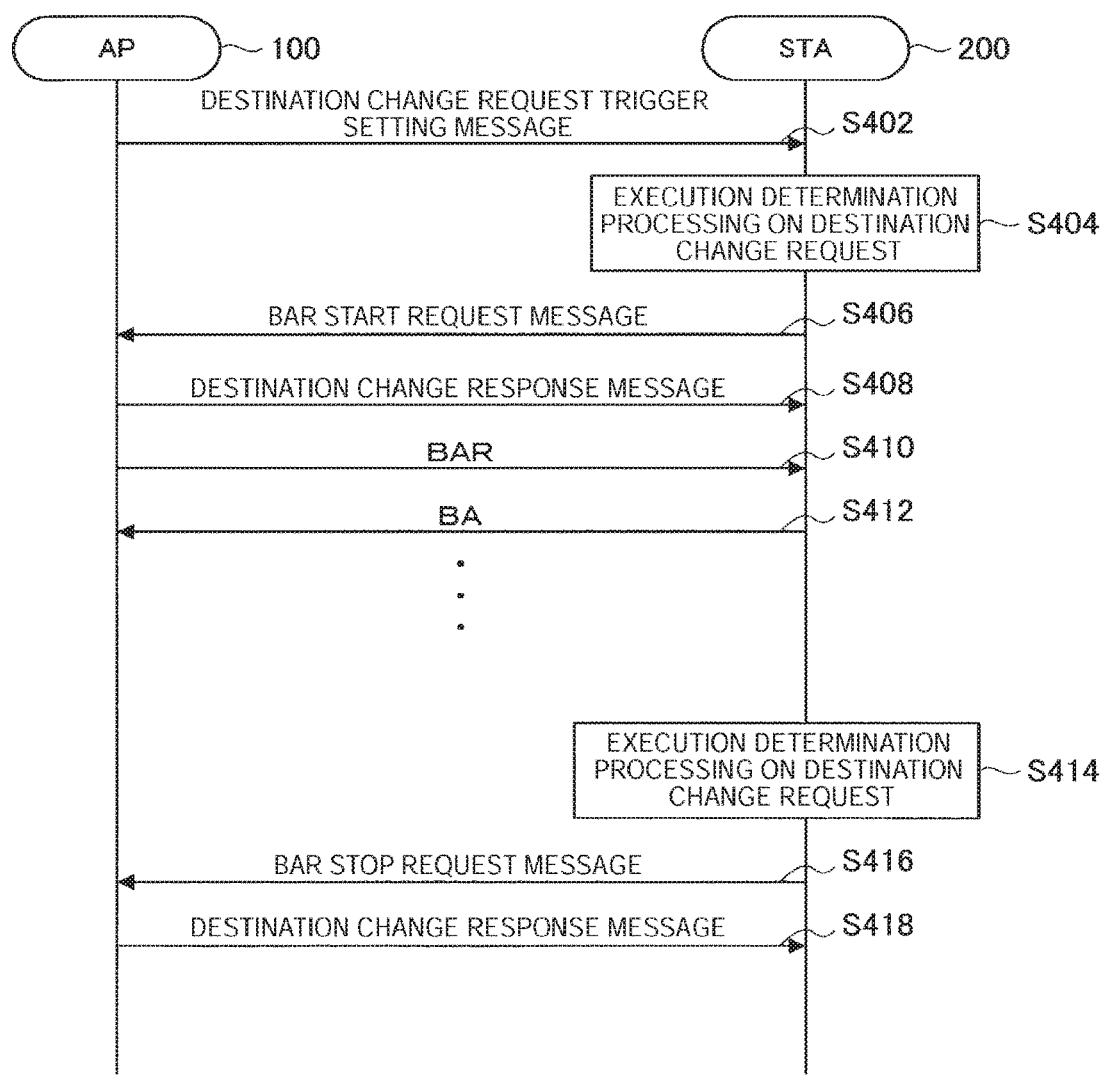
FIG. 7 is a sequence diagram illustrating an example of the procedure of BAR destination change processing executed in the wireless communication system according to the present embodiment.

FIG. 7 is a sequence diagram illustrating an example of the procedure of BAR destination change processing executed in the wireless communication system 1 according to the present embodiment. As illustrated in FIG. 7, the AP 100 and the STA 200 are involved in this sequence. Moreover, in FIG. 7, one STA 200 selected as the BAR destination is illustrated as a representative example, and the other STAs 200 are omitted.

First, in step S402, the AP 100 transmits a destination change request trigger setting message to the STA 200.

Next, in step S404, the STA 200 performs execution determination processing on the destination change request. In one example, the STA 200 determines whether the state matches the trigger that is set on the basis of the destination change request trigger setting message received in step S402. Here, it is assumed that the state matches the trigger for transmitting a BAR start request message. Note that the detailed determination criteria will be described later with reference to FIG. 8.

Next, in step S406, the STA 200 transmits the BAR start request message to the AP 100. The AP 100 selects a BAR destination on the basis of the received BAR start request message. As a result, it is assumed that the STA 200 acting as the source of the BAR start request message is selected as the BAR destination.

Next, in step S408, the AP 100 transmits a destination change response message to the STA 200. The destination change response message includes information indicating that the STA 200 is selected as the BAR destination.

Next, in step S410, the AP 100 transmits the BAR to the STA 200. Moreover, in this figure, the multicast transmission (step S112) described with reference to FIG. 4 is omitted.

Next, in step S412, the STA 200 transmits the BA to the AP 100.

Then, in step S414, the STA 200 performs the execution determination processing on the destination change request. Here, it is assumed that the state matches the trigger for transmitting a BAR stop request message. Moreover, the detailed determination criteria will be described later with reference to FIG. 9.

Next, in step S416, the STA 200 transmits the BAR stop request message to the AP 100. The AP 100 selects a BAR destination on the basis of the received BAR stop request message. As a result, it is assumed that the STA 200 acting as the source of the BAR stop request message is excluded from the BAR destination.

Next, in step S418, the AP 100 transmits a destination change response message to the STA 200. The destination change response message includes information indicating that the STA 200 is excluded from the BAR destination.

The above is a description of an example of the operation processing related to the BAR destination change function in the entire wireless communication system 1. Subsequently, with reference to FIGS. 8 and 9, in the STA 200, an example of processing for determining whether to request the start of transmission of the BAR, and an example of processing for determining whether to request the stop of transmission of the BAR are described.

Figure 8:
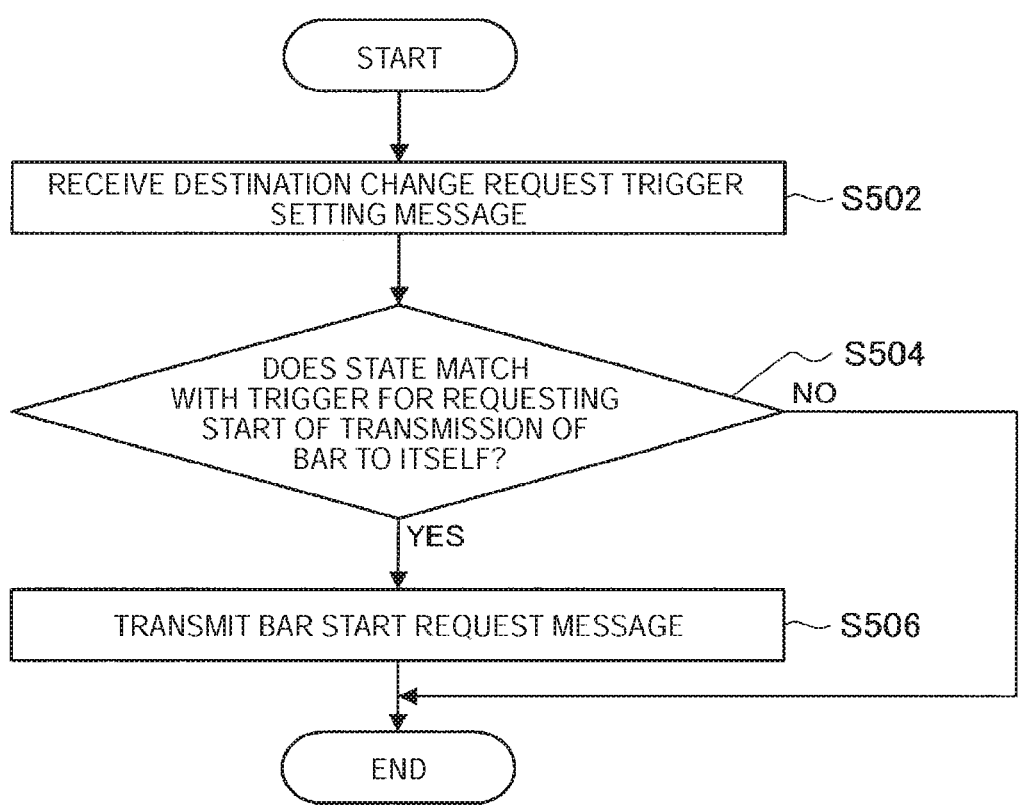
FIG. 8 is a flowchart illustrating an example of a transmission determination processing procedure of a BAR start request message, executed in the STA according to the present embodiment.

FIG. 8 is a flowchart illustrating an example of the procedure of the transmission determination processing of the BAR start request message, which is executed in the STA 200 according to the present embodiment.

As illustrated in FIG. 8, first, in step S502, the wireless communication unit 210 receives the destination change request trigger setting message. In one example, the control unit 230 acquires information indicating various thresholds included in the destination change request trigger setting message, and sets a trigger for transmitting the BAR start request message.

Next, in step S504, the control unit 230 determines whether the state matches a trigger for requesting the start of the transmission of the BAR to the control unit 230. In one example, the control unit 230 may determine whether the control unit 230 itself is not the BAR destination or whether the transmittable upper limit number of the BAR start request message is not reached in the beacon interval. In addition, the control unit 230 may determine whether the reception state information is deteriorated than the threshold.

If it is determined that they do not match (NO in S504), the processing ends.

On the other hand, if it is determined that they match (YES in S504), the control unit 230, in step S506, controls the wireless communication unit 210 so that the wireless communication unit 210 transmits the BAR start request message to the AP 100.

Figure 9:
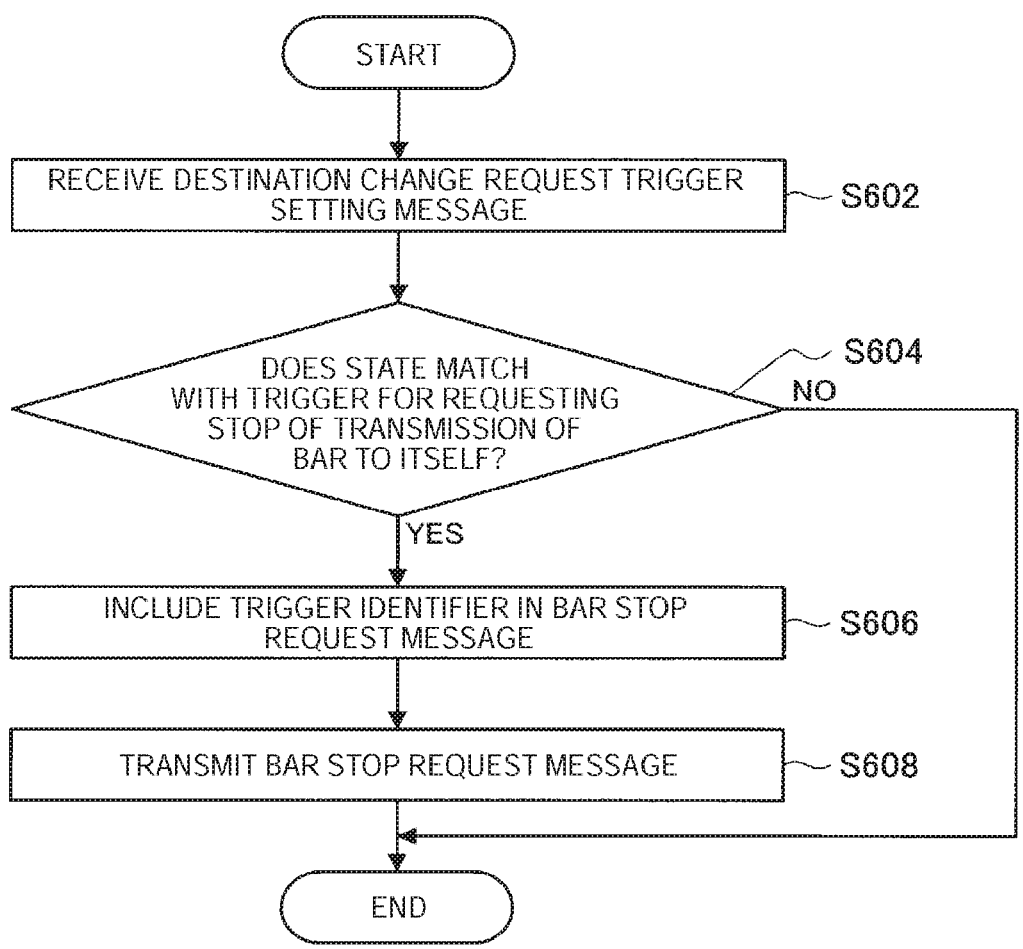
FIG. 9 is a flowchart illustrating an example of a transmission determination processing procedure of a BAR stop request message, executed in the STA according to the present embodiment.

FIG. 9 is a flowchart illustrating an example of the procedure of the transmission determination processing of the BAR stop request message, which is executed in the STA 200 according to the present embodiment.

As illustrated in FIG. 9, first, in step S602, the wireless communication unit 210 receives the destination change request trigger setting message. In one example, the control unit 230 acquires information indicating various thresholds included in the destination change request trigger setting message, and sets a trigger for transmitting the BAR stop request message.

Next, in step S604, the control unit 230 determines whether the state matches a trigger for requesting to stop the transmission of the BAR to the control unit 230. In one example, the control unit 230 may determine whether the control unit 230 itself is the BAR destination. In addition, the control unit 230 may determine whether the reception state information is improved than the threshold, whether the BA from another STA 200 belonging to the multicast group to which the control unit 230 belongs is received successfully, whether the withdrawal of the control unit 230 from the multicast group is detected, or the like.

If it is determined that they do not match (NO in S604), the processing ends.

On the other hand, if it is determined that they match (YES in S604), the control unit 230, in step S606, includes the trigger identifier in the BAR stop request message.

Then, in step S608, the control unit 230 controls the wireless communication unit 210 so that the wireless communication unit 210 transmits the BAR stop request message to the AP 100.

The above is a description of an example of the operation processing related to the BAR destination change function.

<<4. Application Examples>>

The technology according to the present disclosure is applicable to various products. In one example, the wireless communication device 200 may be implemented as a mobile terminal such as smartphones, tablet personal computers (PCs), notebook PCs, portable game terminals, or digital cameras, a fixed-type terminal such as television receivers, printers, digital scanners, or network storages, or a car-mounted terminal such as car navigation devices. In addition, the wireless communication device 200 may be implemented as a terminal (also referred to as machine type communication (MTC) terminal) which performs machine-to-machine (M2M) communication, such as smart meters, vending machines, remote monitoring devices, and point of sale (POS) terminals. Furthermore, the wireless communication device 200 may be a wireless communication module mounted in such terminals (e.g., integrated circuit modules configured in one die).

On the other hand, in one example, the wireless communication device 100 may be implemented as a wireless LAN access point (also referred to as a wireless base station) having or not having a router function. In addition, the wireless communication device 100 may be implemented as a mobile wireless LAN router. Furthermore, the wireless communication device 100 may be a wireless communication module mounted on such devices (e.g., integrated circuit modules configured in one die).

<4.1. First Application Example>

Figure 10:
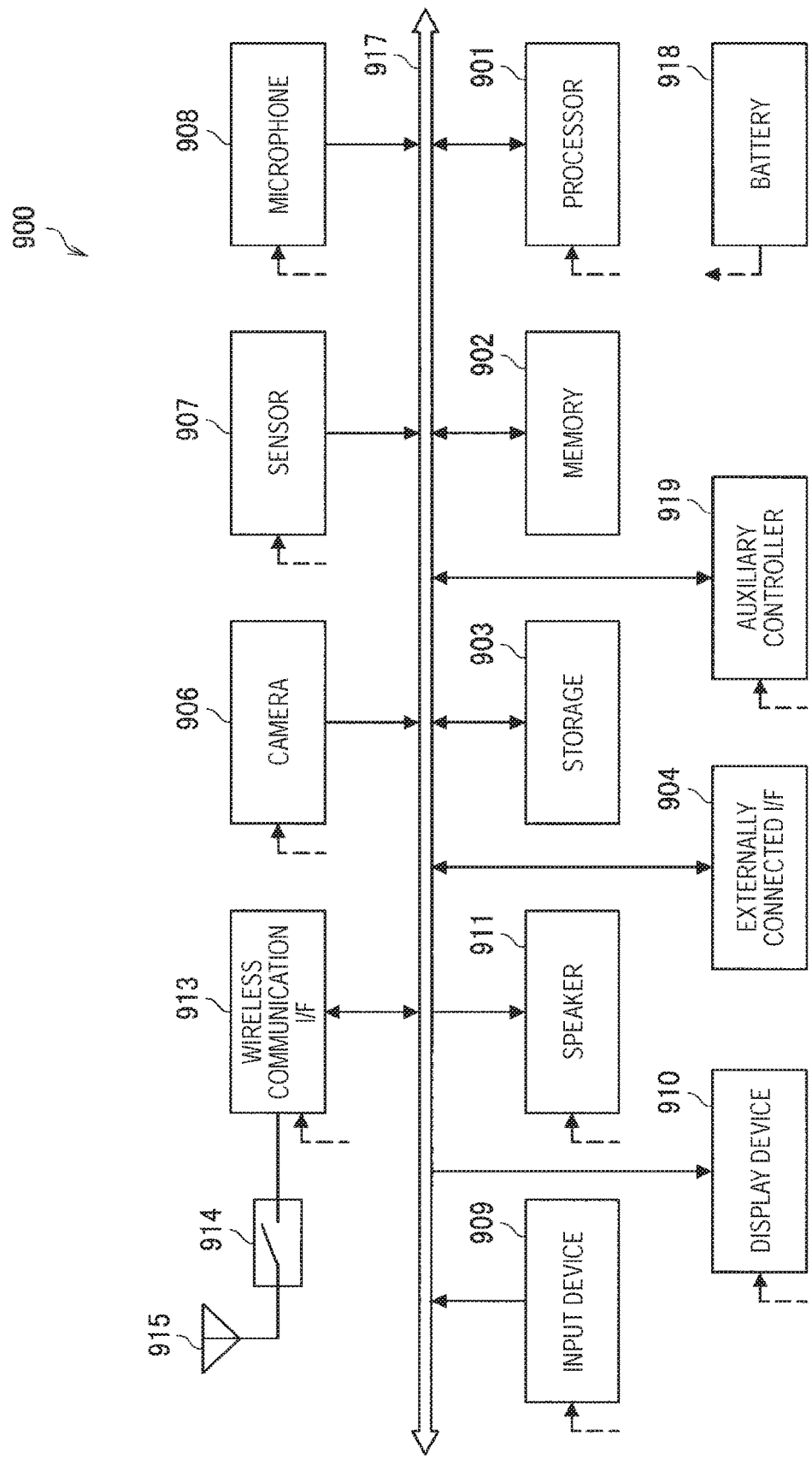
FIG. 10 is a block diagram illustrating an example of a schematic configuration of a smartphone.

FIG. 10 is a block diagram illustrating an example of a schematic configuration of a smartphone 900 to which the technology of the present disclosure can be applied. The smartphone 900 is configured to include a processor 901, a memory 902, a storage 903, an externally connected interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, in one example, a central processing unit (CPU) or a system on chip (SoC), and controls functions of an application layer and other layers of the smartphone 900. The memory 902 includes a random access memory (RAM) and a read only memory (ROM), and stores programs executed by the processor 901 and data. The storage 903 can include a storage medium such as a semiconductor memory or a hard disk. The externally connected interface 904 is an interface for connecting an externally attached device such as a memory card or a universal serial bus (USB) device to the smartphone 900.

The camera 906 has, in one example, an image sensor such as a charge coupled device (CCD) or a complementary metal oxide semiconductor (CMOS), and generates a captured image. The sensor 907 can include a sensor group including, in one example, a positioning sensor, a gyro sensor, a geomagnetic sensor, an acceleration sensor, and the like. The microphone 908 converts voice input to the smartphone 900 into an audio signal. The input device 909 includes, in one example, a touch sensor that detects touches on a screen of the display device 910, a key pad, a keyboard, buttons, switches, and the like, and accepts an operation or information input from a user. The display device 910 has a screen such as a liquid crystal display (LCD) or an organic light emitting diode (OLED) display, and displays an output image of the smartphone 900. The speaker 911 converts an audio signal output from the smartphone 900 into voice.

The wireless communication interface 913 supports one or more wireless LAN standards such as IEEE 802.11a, 11b, 11g, 11n, 11ac, and 11ad, and executes wireless LAN communication. The wireless communication interface 913 can communicate with other devices via a wireless LAN access point in the infrastructure mode. In addition, the wireless communication interface 913 can directly communicate with other devices in a direct communication mode such as an ad hoc mode, and Wi-Fi Direct (registered trademark). In Wi-Fi Direct mode, unlike ad hoc mode, one of two terminals operates as an access point, but communication is performed directly between the terminals. The wireless communication interface 913 can typically include a baseband processor, a radio frequency (RF) circuit, a power amplifier, and the like. The wireless communication interface 913 may be a single-chip module on which a memory for storing a communication control program, a processor for executing the program, and a relevant circuit are integrated. The wireless communication interface 913 may support other types of wireless communication schemes such as a short-range wireless communication scheme, a close proximity wireless communication scheme, or a cellular communication scheme, in addition to the wireless LAN scheme. The antenna switch 914 switches a connection destination of the antenna 915 among a plurality of circuits (e.g., circuits for different wireless communication schemes) included in the wireless communication interface 913. The antenna 915 has a single antenna element or a plurality of antenna elements (e.g., a plurality of antenna elements constituting a MIMO antenna), and is used for transmission and reception of a wireless signal through the wireless communication interface 913.

Moreover, the configuration of the smartphone 900 is not limited to the example of FIG. 10, and may include a plurality of antennas (e.g., an antenna for a wireless LAN and an antenna for a proximity wireless communication scheme). In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 illustrated in FIG. 10 via a power supply line partially indicated by dashed lines in the figure. The auxiliary controller 919 operates the required minimum functions of the smartphone 900, in one example, in the sleep mode.

In the smartphone 900 illustrated in FIG. 10, one or more components (e.g., at least one of the wireless communication unit 210, the storage unit 220 and the control unit 230) included in the wireless communication device 200 as described with reference to FIG. 3 may be installed in the wireless communication interface 913. In addition, at least part of these components may be installed in the processor 901 or the auxiliary controller 919. In one example, the smartphone 900 may be provided with a module including the wireless communication interface 913, the processor 901, and/or the auxiliary controller 919, and the above-described one or more components may be installed in the module. In this case, the module may store a program for causing the processor to function as the above-described one or more components (i.e., a program for causing the processor to execute the operation of the above-described one or more components), and may execute the program. In another example, a program for causing the processor to function as the above-described one or more components may be installed in the smartphone 900, and may be executed by the wireless communication interface 913, the processor 901, and/or the auxiliary controller 919. As described above, the smartphone 900 or the above-described module may be provided as a device that includes the above-described one or more components, and a program for causing the processor to function as the above-described one or more components may be provided. In addition, a readable recording medium on which the above-described program is recorded may be provided.

Moreover, the smartphone 900 may operate as a wireless access point (software AP) by the processor 901 executing an access point function at the application level. In addition, the wireless communication interface 913 may have the wireless access point function.

<4.2. Second Application Example>

Figure 11:
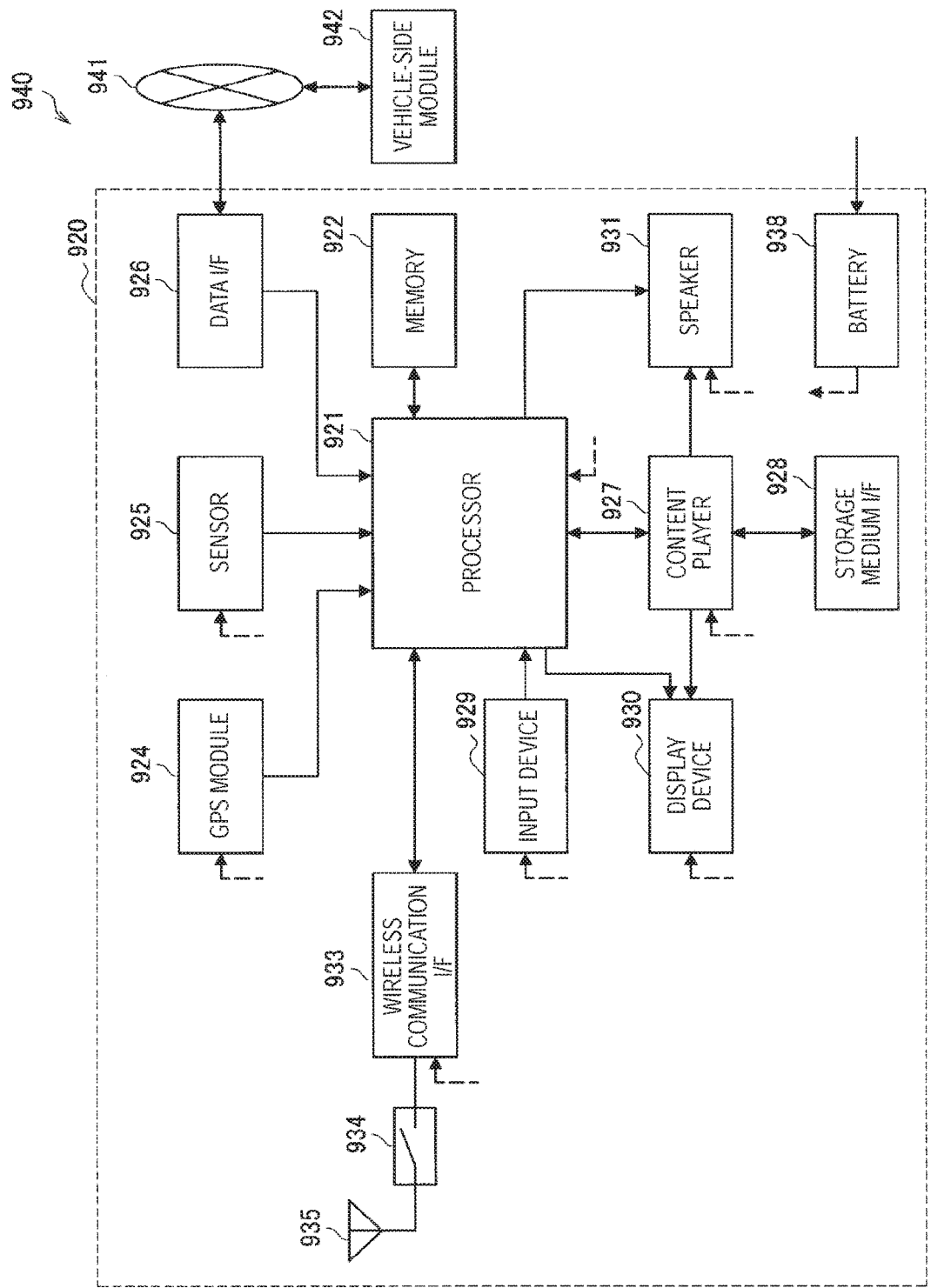
FIG. 11 is a block diagram illustrating an example of a schematic configuration of a car navigation device.

FIG. 11 is a block diagram illustrating an example of a schematic configuration of a car navigation device 920 to which the technology according to the present disclosure can be applied. The car navigation device 920 is configured to include a processor 921, a memory 922, a global positioning system (GPS) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, in one example, a CPU or SoC, and controls a navigation function and other functions of the car navigation device 920. The memory 922 includes a RAM and a ROM, and stores programs executed by the processor 921 and data.

The GPS module 924 measures the position (e.g., latitude, longitude, and altitude) of the car navigation device 920 using GPS signals received from a GPS satellite. The sensor 925 can include a sensor group including, in one example, a gyro sensor, a geomagnetic sensor, and a barometric pressure sensor. The data interface 926 is connected to, in one example, an in-vehicle network 941 via a terminal that is not illustrated, and acquires data generated on the vehicle side such as car speed data.

The content player 927 reproduces the content stored in a storage medium (e.g., CD or DVD) inserted into the storage medium interface 928. The input device 929 includes, in one example, a touch sensor that detects touches on a screen of the display device 930, buttons, switches, and the like, and accepts an operation or information input from the user. The display device 930 has a screen such as an LCD or an OLED display, and displays a navigation function or an image of content. The speaker 931 outputs sound of the navigation function or the content to be reproduced.

The wireless communication interface 933 supports one or more wireless LAN standards such as IEEE 802.11a, 11b, 11g, 11n, 11ac, and 11ad, and executes wireless LAN communication. The wireless communication interface 933 can communicate with other devices via a wireless LAN access point in the infrastructure mode. In addition, the wireless communication interface 933 can directly communicate with other devices in a direct communication mode, such as an ad hoc mode and Wi-Fi Direct. The wireless communication interface 933 can typically have a baseband processor, an RF circuit, a power amplifier, and the like. The wireless communication interface 933 may be a single-chip module on which a memory for storing a communication control program, a processor for executing the program, and a relevant circuit are integrated. The wireless communication interface 933 may support other types of wireless communication schemes such as a short-range wireless communication scheme, a close proximity wireless communication scheme, or a cellular communication scheme, in addition to the wireless LAN scheme. The antenna switch 934 switches a connection destination of the antenna 935 among a plurality of circuits included in the wireless communication interface 933. The antenna 935 has a single antenna element or a plurality of antenna elements, and is used for transmission and reception of a wireless signal from the wireless communication interface 933.

Moreover, the configuration of the car navigation device 920 is not limited to the example of FIG. 11, and may include a plurality of antennas. In this case, the antenna switch 934 may be omitted from the configuration of the car navigation device 920.

The battery 938 supplies electric power to each of the blocks of the car navigation device 920 illustrated in FIG. 11 via a power supply line partially indicated by a dashed line in the figure. In addition, the battery 938 accumulates electric power supplied from the vehicle side.

In the car navigation device 920 illustrated in FIG. 11, one or more components (e.g., at least one of the wireless communication unit 210, the storage unit 220, and the control unit 230) included in the wireless communication device 200 described with reference to FIG. 3 may be installed in the wireless communication interface 933. In addition, at least part of these functions may be implemented in the processor 921. In one example, the car navigation device 920 includes a module including the wireless communication interface 933 and/or the processor 921, and the above-described one or more components may be installed in the module. In this case, the module may store a program for causing the processor to function as the above-described one or more components (i.e., a program for causing the processor to execute the operation of the above-described one or more components) and may execute the program. In another example, a program for causing the processor to function as the above-described one or more components may be installed in the car navigation device 920, and the wireless communication interface 933 and/or the processor 901 may execute the program. As described above, the car navigation device 920 or the above-described module may be provided as a device that includes the above-described one or more components, and a program for causing the processor to function as the above-described one or more components may be provided. In addition, a readable recording medium on which the above-described program is recorded may be provided.

Further, the wireless communication interface 933 may operate as the above-described AP 100 and may provide wireless connection to a terminal carried by a user who rides in a vehicle.

Further, the technology according to the present disclosure may be implemented as an in-vehicle system (or vehicle) 940 including one or more blocks of the above-described car navigation device 920, the in-vehicle network 941, and a vehicle-side module 942. The vehicle-side module 942 generates vehicle-side data such as vehicle speed, engine rpm, or failure information, and outputs the generated data to the in-vehicle network 941.

<4.3. Third Application Example>

Figure 12:
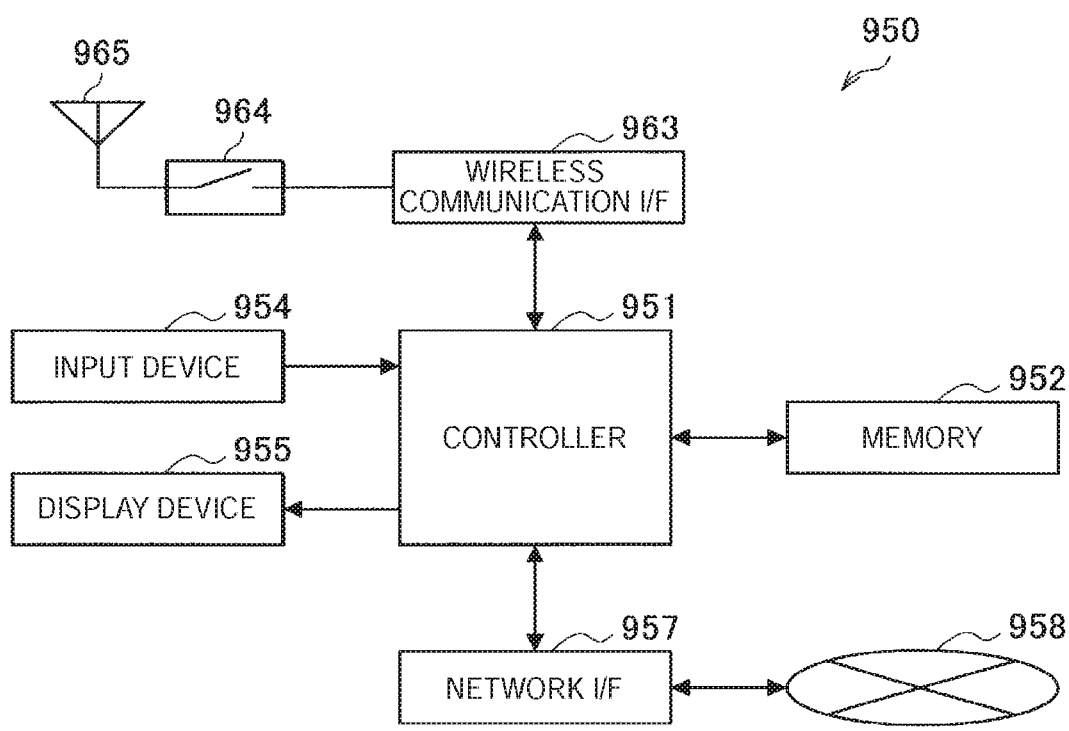
FIG. 12 is a block diagram illustrating an example of a schematic configuration of a wireless access point.

FIG. 12 is a block diagram illustrating an example of a schematic configuration of a wireless access point 950 to which the technology according to the present disclosure can be applied. The wireless access point 950 is configured to include a controller 951, a memory 952, an input device 954, a display device 955, a network interface 957, a wireless communication interface 963, an antenna switch 964, and an antenna 965.

The controller 951 may be, in one example, a CPU or a digital signal processor (DSP), and operates various functions (e.g., access restriction, routing, encryption, firewall, and log management) of the Internet Protocol (IP) layer and higher layers of the wireless access point 950. The memory 952 includes a RAM and a ROM, and stores a program to be executed by the controller 951 and various kinds of control data (e.g., a terminal list, a routing table, an encryption key, security settings, and a log).

The input device 954 includes, in one example, a button or a switch, and accepts an operation from a user. The display device 955 includes an LED lamp or the like, and displays operation status of the wireless access point 950.

The network interface 957 is a wired communication interface that connects the wireless access point 950 to the wired communication network 958. The network interface 957 may include a plurality of connection terminals. The wired communication network 958 may be a LAN such as Ethernet (registered trademark) or a wide area network (WAN).

The wireless communication interface 963 supports one or more wireless LAN standards such as IEEE 802.11a, 11b, 11g, 11n, 11ac, and 11ad, and provides wireless connection to a neighboring terminal by functioning as an access point. The wireless communication interface 963 can typically have a baseband processor, an RF circuit, a power amplifier, and the like. The wireless communication interface 963 may be a single-chip module on which a memory for storing a communication control program, a processor for executing the program, and a relevant circuit are integrated. The antenna switch 964 switches a connection destination of the antenna 965 among a plurality of circuits included in the wireless communication interface 963. The antenna 965 has a single antenna element or a plurality of antenna elements, and is used for transmission and reception of a wireless signal from the wireless communication interface 963.

In the wireless access point 950 illustrated in FIG. 12, one or more components (e.g., at least one of the wireless communication unit 110, the storage unit 120, and the control unit 130) included in the wireless communication device 100 described with reference to FIG. 2 may be implemented in the wireless communication interface 963. In addition, at least part of these functions may be implemented in the controller 951. In one example, the wireless access point 950 may be provided with a module including the wireless communication interface 963 and/or the controller 951, and the above-described one or more components may be installed in the module. In this case, the module may store a program for causing the processor to function as the above-described one or more components (i.e., a program for causing the processor to execute the operation of the above-described one or more components), and may execute the program. In another example, a program for causing the processor to function as the above-described one or more components may be installed in the wireless access point 950, and the wireless communication interface 963 and/or the controller 951 may execute the program. As described above, the wireless access point 950 or the above-described module may be provided as a device including the above-described one or more components, and a program for causing the processor to function as the above-described one or more components may be provided. In addition, a readable recording medium on which the above-described program is recorded may be provided.

<<5. Summary>>

Embodiments of the present disclosure have been described in detail with reference to FIGS. 1 to 12. As described above, the STA 200 that performs wireless communication with the AP 100 transmits a destination change request message, which requests a change of the destination of the BAR for the multi cast transmission by the AP 100, to the AP 100. The AP 100 can flexibly change the BAR destination on the basis of the destination change request message from the STA 200. This makes it possible for the wireless communication system 1 to improve the reliability of the entire multicast group.

In one example, the destination change request message may be a message requesting that STA 200 itself is included in the BAR destination. This message allows the AP 100 to select the STA 200 having a bad reception state as the BAR destination, and thus appropriate retransmission is performed, thereby improving the reliability.

In one example, the destination change request message may be a message requesting to exclude the STA 200 itself from the BAR destination. This message allow the AP 100 to change the destination of the BAR from the STA 200 having a good reception state to the STA 200 having a bad reception state, and to improve the reliability of the entire wireless communication system 1.

The preferred embodiments of the present disclosure have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Note that it is not necessary for the processes described in this specification with reference to the flowchart or sequence diagram to be executed in the order shown in the flowchart or sequence diagram. Some processing steps may be performed in parallel. Further, some of additional steps can be adopted, or some processing steps can be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A wireless communication device including:

a wireless communication unit configured to communicate wirelessly with another wireless communication device; and a control unit configured to control the wireless communication unit such that the wireless communication unit transmits, to the other wireless communication device, a first message that requests change in a destination of an acknowledgement request frame relating to multicast transmission by the other wireless communication device.

(2)

The wireless communication device according to (1), in which the first message is a message which requests that the destination of the acknowledgement request frame include the wireless communication device.

(3)

The wireless communication device according to (2), in which the first message includes an acknowledgement response bitmap relating to the multicast transmission.

(4)

The wireless communication device according to (2) or (3), in which the first message includes information on a reception state in the wireless communication unit relating to the multicast transmission.

(5)

The wireless communication device according to (4), in which the information on the reception state includes at least any of throughput, a packet loss rate, number of multicast packets received successfully, number of multicast packets that fail to be received, and ratio of a sum of noise power and interference signal power to desired signal power.

(6)

The wireless communication device according to any one of (2) to (5), in which the control unit controls the wireless communication unit such that the wireless communication unit transmits the first message by setting, as a trigger, at least any of an event that a period during which the acknowledgment request frame is not received exceeds a threshold and an event that the information on the reception state in the wireless communication unit relating to the multicast transmission is deteriorated than a threshold.

(7)

The wireless communication device according to (1), in which the first message is a message which requests that the wireless communication device be excluded from the destination of the acknowledgment request frame.

(8)

The wireless communication device according to (7), in which the control unit controls the wireless communication unit such that the wireless communication unit transmits the first message by setting, as a trigger, at least any of an event that an acknowledgment response frame from another wireless communication terminal belonging to a multicast group to which the wireless communication device belongs is received successfully, an event that reception power of the acknowledgment response frame exceeds a threshold, an event that number of times of successful reception of the acknowledgment response frame exceeds a threshold, an event that a correlation value between an acknowledgment response bitmap included in the acknowledgment response frame received successfully and an acknowledgment response bitmap relating to reception in the wireless communication unit exceeds a threshold, an event that withdrawal of the wireless communication device from the multicast group is detected, and an event that information on a reception state in the wireless communication unit relating to the multicast transmission is improved than a threshold.

(9)

A wireless communication device including:

a wireless communication unit configured to communicate wirelessly with another wireless communication device; and a control unit configured to select a destination of an acknowledgement request frame relating to multicast transmission by the wireless communication unit on the basis of a first message that requests change in the destination of the acknowledgement request frame received from the other wireless communication device by the wireless communication unit.

(10)

The wireless communication device according to (9), in which the control unit selects the destination of the acknowledgment request frame on the basis of information on a reception state in one or more of the other wireless communication devices belonging to a multicast group relating to the multi cast transmission.

(11)

The wireless communication device according to (9) or (10), in which the control unit controls the wireless communication unit such that the wireless communication unit transmits a third message by using at least one of a broadcast frame and a multicast frame addressed to a multicast group relating to the multicast transmission, the third message including information used for a trigger to transmit the first message in the other wireless communication device.

(12)

The wireless communication device according to (11), in which the first message is a message which requests that the destination of the acknowledgment request frame include the other wireless communication device, and the third message is transmitted using a beacon frame and includes at least any of information indicating a threshold of a period during which the acknowledgment request frame is not received, information indicating a threshold of information on a reception state in the other wireless communication device, and information indicating an upper limit of number of the first messages that is transmittable in a beacon interval.

(13)

The wireless communication device according to (11), in which the first message is a message which requests that the wireless communication device be excluded from the destination of the acknowledgment request frame, and the third message is transmitted using a beacon frame and includes at least any of information indicating a threshold of time elapsed since last reception of the acknowledgment request frame, information indicating a threshold of information on a reception state in the other wireless communication device, information indicating a threshold of reception power of an acknowledgement response frame from another wireless communication terminal belonging to a same multicast group as the other wireless communication device, information indicating a threshold of number of times the acknowledgment response frame is received, and information indicating a threshold of a correlation value with an acknowledgment response bitmap included in the acknowledgment response frame.

(14)

The wireless communication device according to any one of (9) to (13), in which the control unit sets a maximum number of the destinations of the acknowledgment request frame.

(15)

The wireless communication device according to any one of (9) to (14), in which the control unit controls the wireless communication unit such that the wireless communication unit transmits a second message to the other wireless communication device acting as a source of the first message, the second message including information indicating a selection result of the destination of the acknowledgement request frame.

(16)

The wireless communication device according to any one of (9) to (15), in which the control unit controls transmission power of a multicast frame depending on a reception state of the destination of the acknowledgement request frame.

(17)

A method of wireless communication in a wireless communication device that communicates wirelessly with another wireless communication device, the method including:

transmitting, to the other wireless communication device, a first message that requests change in a destination of an acknowledgement request frame relating to multicast transmission by the other wireless communication device.

(18)

A method of wireless communication in a wireless communication device that communicates wirelessly with another wireless communication device, the method including:

selecting a destination of an acknowledgement request frame relating to multicast transmission by the wireless communication device on the basis of a first message that requests change in the destination of the acknowledgement request frame received from the other wireless communication device by the wireless communication unit.

(19)

A program for causing a computer to function as:

a wireless communication unit configured to communicate wirelessly with another wireless communication device; and a control unit configured to control the wireless communication unit such that the wireless communication unit transmits, to the other wireless communication device, a first message that requests change in a destination of an acknowledgement request frame relating to multicast transmission by the other wireless communication device.

(20)

A program for causing a computer to function as:

a wireless communication unit configured to communicate wirelessly with another wireless communication device; and a control unit configured to select a destination of an acknowledgement request frame relating to multicast transmission by the wireless communication unit on the basis of a first message that requests change in the destination of the acknowledgement request frame received from the other wireless communication device by the wireless communication unit.

REFERENCE SIGNS LIST 1 wireless communication system
100 AP
110 wireless communication unit
120 storage unit
130 control unit
200 STA
210 wireless communication unit
220 storage unit
230 control unit

The invention claimed is:

1. A wireless communication device comprising:
circuitry configured to
communicate wirelessly with another wireless communication device; and
control transmission, to the other wireless communication device, of a first message that requests change in a destination of an acknowledgement request frame relating to multicast transmission by the other wireless communication device, wherein
the first message is a message which requests that the destination of the acknowledgement request frame include the wireless communication device,
the other wireless communication device controls transmission of a third message by using at least one of a broadcast frame and a multicast frame addressed to a multicast group relating to the multicast transmission, the third message including information used for a trigger to transmit the first message in the wireless communication device, and
the third message is transmitted using a beacon frame and includes information indicating a threshold of a period during which the acknowledgment request frame is not received and information indicating an upper limit of number of the first messages that is transmittable in a beacon interval.

2. The wireless communication device according to claim 1, wherein the first message includes an acknowledgement response bitmap relating to the multicast transmission.

3. The wireless communication device according to claim 1, wherein the first message includes information on a reception state in the circuitry relating to the multicast transmission.

4. The wireless communication device according to claim 3, wherein the information on the reception state includes at least any of throughput, a packet loss rate, number of multicast packets received successfully, number of multicast packets that fail to be received, and ratio of a sum of noise power and interference signal power to desired signal power.

5. The wireless communication device according to claim 1, wherein the circuitry controls transmission of the first message by setting, as a trigger, at least any of an event that a period during which the acknowledgment request frame is not received exceeds a threshold and an event that the information on the reception state in the wireless communication unit relating to the multicast transmission is deteriorated than a threshold.

6. The wireless communication device according to claim 1, wherein the first message is a message which requests that the wireless communication device be excluded from the destination of the acknowledgment request frame.

7. The wireless communication device according to claim 6, wherein the circuitry controls transmission of the first message by setting, as a trigger, at least any of an event that an acknowledgment response frame from another wireless communication terminal belonging to a multicast group to which the wireless communication device belongs is received successfully, an event that reception power of the acknowledgment response frame exceeds a threshold, an event that number of times of successful reception of the acknowledgment response frame exceeds a threshold, an event that a correlation value between an acknowledgment response bitmap included in the acknowledgment response frame received successfully and an acknowledgment response bitmap relating to reception in the wireless communication unit exceeds a threshold, an event that withdrawal of the wireless communication device from the multicast group is detected, and an event that information on a reception state in the wireless communication unit relating to the multicast transmission is improved than a threshold.

8. The wireless communication device according to claim 1, wherein the third message includes information indicating a threshold of information on a reception state in the wireless communication device.

9. The wireless communication device according to claim 1, wherein the third message includes information indicating a threshold of time elapsed since last reception of the acknowledgment request frame.

10. The wireless communication device according to claim 1, wherein the third message includes information indicating a threshold of number of times the acknowledgment response frame is received.

11. A wireless communication device comprising:
circuitry configured to
communicate wirelessly with another wireless communication device;
select a destination of an acknowledgement request frame relating to multicast transmission on the basis of a first message that requests change in the destination of the acknowledgement request frame received from the other wireless communication device; and
control transmission of a third message by using at least one of a broadcast frame and a multicast frame addressed to a multicast group relating to the multicast transmission, the third message including information used for a trigger to transmit the first message in the other wireless communication device, wherein
the first message is a message which requests that the destination of the acknowledgment request frame include the other wireless communication device,
the third message is transmitted using a beacon frame and includes information indicating a threshold of a period during which the acknowledgment request frame is not received and information indicating an upper limit of number of the first messages that is transmittable in a beacon interval.

12. The wireless communication device according to claim 11, wherein the circuitry selects the destination of the acknowledgment request frame on the basis of information on a reception state in one or more of the other wireless communication devices belonging to a multicast group relating to the multicast transmission.

13. The wireless communication device according to claim 11, wherein the circuitry sets a maximum number of the destinations of the acknowledgment request frame.

14. The wireless communication device according to claim 11, wherein the circuitry controls transmission of a second message to the other wireless communication device acting as a source of the first message, the second message including information indicating a selection result of the destination of the acknowledgement request frame.

15. The wireless communication device according to claim 11, wherein the circuitry controls transmission power of a multicast frame depending on a reception state of the destination of the acknowledgement request frame.

16. A wireless communication device comprising:
circuitry configured to
communicate wirelessly with another wireless communication device; and
control transmission, to the other wireless communication device, of a first message that requests change in a destination of an acknowledgement request frame relating to multicast transmission by the other wireless communication device, wherein
the first message is a message which requests that the destination of the acknowledgement request frame include the wireless communication device,
the other wireless communication device controls transmission of a third message by using at least one of a broadcast frame and a multicast frame addressed to a multicast group relating to the multicast transmission, the third message including information used for a trigger to transmit the first message in the wireless communication device, and
the third message is transmitted using a beacon frame and includes information indicating a threshold of a period during which the acknowledgment request frame is not received and information indicating a threshold of reception power of an acknowledgement response frame from another wireless communication terminal belonging to a same multicast group as the other wireless communication device.

17. A wireless communication device comprising:
circuitry configured to
communicate wirelessly with another wireless communication device; and
control transmission, to the other wireless communication device, of a first message that requests change in a destination of an acknowledgement request frame relating to multicast transmission by the other wireless communication device, wherein the first message is a message which requests that the destination of the acknowledgement request frame include the wireless communication device, the other wireless communication device controls transmission of a third message by using at least one of a broadcast frame and a multicast frame addressed to a multicast group relating to the multicast transmission, the third message including information used for a trigger to transmit the first message in the wireless communication device, and the third message is transmitted using a beacon frame and includes information indicating a threshold of a period during which the acknowledgment request frame is not received and information indicating a threshold of a correlation value with an acknowledgment response bitmap included in the acknowledgment response frame.

* * * * *